US007656430B2

(12) United States Patent
Miyamaki et al.

(10) Patent No.: US 7,656,430 B2
(45) Date of Patent: Feb. 2, 2010

(54) INFORMATION PROCESSING SYSTEM, INFORMATION PROCESSING APPARATUS AND METHOD, AND PROGRAM

(75) Inventors: Hideo Miyamaki, Tokyo (JP); Masaharu Suzuki, Kanagawa (JP); Asako Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 437 days.

(21) Appl. No.: 11/359,386

(22) Filed: Feb. 23, 2006

(65) Prior Publication Data

US 2006/0192887 A1 Aug. 31, 2006

(30) Foreign Application Priority Data

Feb. 28, 2005 (JP) ............................ 2005-054395

(51) Int. Cl.
*H04N 5/228* (2006.01)

(52) U.S. Cl. ................................ 348/208.14; 348/143

(58) Field of Classification Search ......... 348/143–161, 348/208.1–208.16, 211.1–211.14
See application file for complete search history.

(56) References Cited

U.S. PATENT DOCUMENTS

| | | | | |
|---|---|---|---|---|
| 5,666,157 | A * | 9/1997 | Aviv | 348/152 |
| 6,462,773 | B1 * | 10/2002 | Koga | 348/143 |
| 6,507,779 | B2 * | 1/2003 | Breed et al. | 701/45 |
| 6,694,251 | B2 * | 2/2004 | Negishi et al. | 701/200 |
| 6,812,835 | B2 * | 11/2004 | Ito et al. | 340/541 |
| 6,909,790 | B2 * | 6/2005 | Chiu et al. | 382/103 |
| 7,336,297 | B2 * | 2/2008 | Ishigami et al. | 348/143 |
| 7,385,626 | B2 * | 6/2008 | Aggarwal et al. | 348/143 |
| 7,450,735 | B1 * | 11/2008 | Shah et al. | 382/103 |
| 2003/0169335 | A1 * | 9/2003 | Monroe | 348/143 |
| 2004/0119819 | A1 * | 6/2004 | Aggarwal et al. | 348/143 |
| 2004/0145658 | A1 * | 7/2004 | Lev-Ran et al. | 348/143 |
| 2005/0073580 | A1 * | 4/2005 | Takeda et al. | 348/143 |
| 2005/0104958 | A1 * | 5/2005 | Egnal et al. | 348/143 |
| 2006/0007308 | A1 * | 1/2006 | Ide et al. | 348/143 |
| 2007/0070190 | A1 * | 3/2007 | Yin et al. | 348/36 |

FOREIGN PATENT DOCUMENTS

| | | |
|---|---|---|
| JP | 62-109485 | 5/1987 |
| JP | 08-205131 | 8/1996 |
| JP | 2004-201231 | 7/2004 |

* cited by examiner

*Primary Examiner*—Tuan Ho
*Assistant Examiner*—Don Nguyen
(74) *Attorney, Agent, or Firm*—Oblon, Spivak, McClelland, Maier & Neustadt, L.L.P.

(57) ABSTRACT

An information processing apparatus and method is disclosed wherein a detailed image of a moving body can be picked up accurately. A tracking object pan tilt zoom module reads out moving body information stored in a moving body tracking rank management database at predetermined intervals of time, and pan tilt movement of a zoom camera is controlled based on angle-of-view information as appearance information corresponding to an angle of view of a moving body having the highest priority rank. At this time, an additional tracking object pan tilt module reads out the latest moving body information of the moving body tracking rank management database at intervals of time sufficiently shorter than the predetermined intervals of time at which the tracking object pan tilt zoom process is repeated, and the pan tilt movement of the zoom camera is further controlled repetitively.

12 Claims, 18 Drawing Sheets

CAMERA
11-1
CAMERA
11-2
CAMERA
11-3
CAMERA
11-4
51
52
1

FIG. 4

CAMERA 11-1
CAMERA 11-2
CAMERA 11-3
CAMERA 11-4
REC START
REC STOP

RELATED ART

IMAGE PICKUP
SENSOR IMAGE
121
121A
121B
122
122A
122B
111
131
132
151
152
161
162
171
172
A
B
C
D
X
Y
101

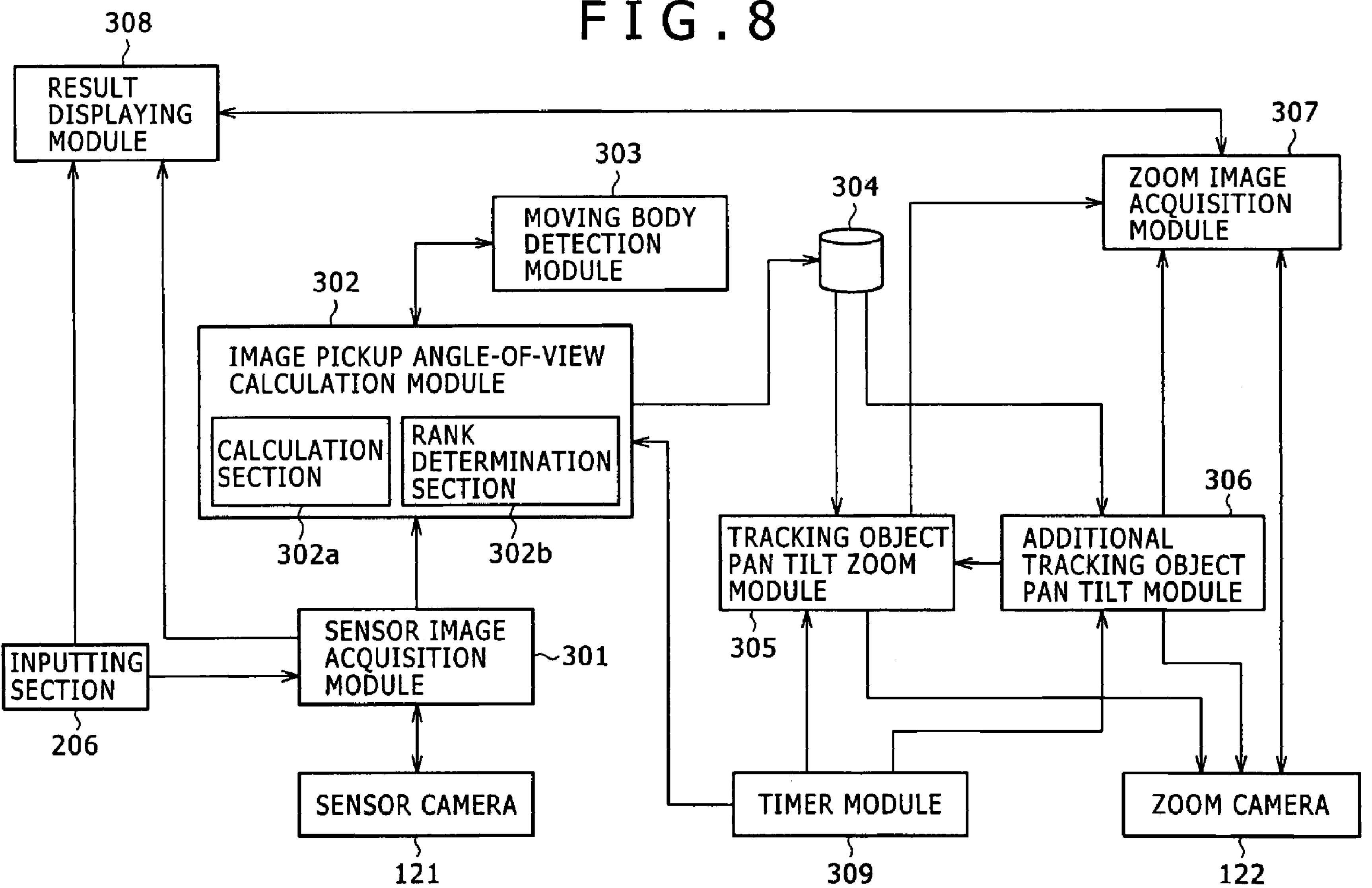
FIG. 8
308
RESULT DISPLAYING MODULE
303
MOVING BODY DETECTION MODULE
304
307
ZOOM IMAGE ACQUISITION MODULE
302
IMAGE PICKUP ANGLE-OF-VIEW CALCULATION MODULE
CALCULATION SECTION
RANK DETERMINATION SECTION
302a
302b
306
TRACKING OBJECT PAN TILT ZOOM MODULE
ADDITIONAL TRACKING OBJECT PAN TILT MODULE
305
INPUTTING SECTION
SENSOR IMAGE ACQUISITION MODULE
301
206
SENSOR CAMERA
TIMER MODULE
ZOOM CAMERA
121
309
122

FIG. 9

| RANK | TIME OF APPEARANCE | TIME OF DISAPPEARANCE | APPEARANCE POSITION | ANGLE-OF-VIEW ID | REPRODUCTION STARTING POSITION | CAMERA ID |
|---|---|---|---|---|---|---|
| 1 | 10:00 | 11:00 | (1,2)(1,5)<br>(2,2)(2,5) | 1 | FRAME#1 | 1 |
| 2 | 10:05 | 10:30 | (3,5)(3,9)<br>(5,5)(5,9) | 2 | FRAME#2 | 1 |

INFORMATION PROCESSING SYSTEM, INFORMATION PROCESSING APPARATUS AND METHOD, AND PROGRAM

CROSS REFERENCES TO RELATED APPLICATIONS

The present invention contains subject matter related to Japanese Patent Application JP 2005-054395 filed in the Japanese Patent Office on Feb. 28, 2005, the entire contents of which being incorporated herein by reference.

BACKGROUND OF THE INVENTION

This invention relates to an information processing system, an information processing apparatus and method, and a program, and more particularly to an information processing system, an information processing apparatus and method, and a program wherein an image of a predetermined region can be picked up and an image of moving bodies in the predetermined region can be picked up.

In recent years, in order to assure the security, a multi-point camera monitoring system (multi camera system) is frequently adopted, for example, in a bank, a parking area, a house and so forth in which an automatic teller machine (ATM) is placed.

Such a multi camera system as described above includes a plurality of video cameras and a recording apparatus for recording images acquired by the video cameras. An apparatus for use with such a multi camera system as described above has been proposed wherein a plurality of images are reduced in scale and combined into a one-frame image as disclosed for example, in Japanese Patent Laid-Open No. Hei 10-108163. Also a device has been proposed wherein images from a plurality of video cameras are collected and recorded on a recording medium such as a video tape as disclosed, for example, in Japanese Patent Laid-Open No. 2000-243062.

FIG. 1 shows an appearance of an example of a multi camera system in related art.

Referring to FIG. 1, the multi camera system 1 shown includes four cameras 11-1 to 11-4. The cameras 11-1 to 11-4 are stationary cameras whose photographing direction is fixed or pan tilt zoom cameras whose photographing direction is variable. The cameras 11-1 to 11-4 monitor a region 21 of a circular wide area of a diameter of 40 m, for example, in a parking area.

FIG. 2 shows an example of a configuration of the multi camera system 1 shown in FIG. 1.

Referring to FIG. 2, each of the cameras 11-1 to 11-4 picks up an image. The cameras 11-1 to 11-4 are individually connected to a recording apparatus 41 and supply analog signals of images obtained by image pickup to the recording apparatus 41. The recording apparatus 41 records image data which are digital signals of images obtained by A/D conversion of the analog signals of the images supplied from the cameras 11-1 to 11-4. Further, the recording apparatus 41 is connected to a display apparatus 42 and causes the display apparatus 42 to display an image corresponding to the image data.

However, in the multi camera system 1 in FIG. 2, the cameras which can be connected to the recording apparatus 41 are limited to only four cameras 11-1 to 11-4, and therefore, the extensibility of the multi camera system 1 is poor.

FIG. 3 shows another example of the configuration of the multi camera system 1 in FIG. 1.

Referring to FIG. 3, the cameras 11-1 to 11-4 are connected to a personal computer (PC) 52 through a network 51. Each of the cameras 11-1 to 11-4 picks up an image and transmits image data obtained by the image pickup to the PC 52 through the network 51 in accordance with the IP (Internet Protocol). The PC 52 records the image data and displays an image corresponding to the image data.

Now, the image data to be recorded in the recording apparatus 41 shown in FIG. 2 or the PC 52 shown in FIG. 3 is described with reference to FIG. 4.

As seen in FIG. 4, the recording apparatus 41 or the PC 52 records all of the image data obtained by the cameras 11-1 to 11-4. Accordingly, where the multi camera system 1 is used for monitoring, even if the image data are compressed in accordance with a predetermined compression method, the amount of the image data to be recorded in the recording apparatus 41 or the PC 52 is very great.

For example, where image data compressed under predetermined conditions (50 KB/frame, 10 frame/sec) in accordance with the JPEG (Joint Photographic Experts Group) system are recorded for 24 hours, in the multi camera system 1 formed from four cameras 11-1 to 11-4, the amount of image data to be recorded in the recording apparatus 41 or the PC 52 is approximately 164 GB. Further, where the multi camera system 1 is formed from eight cameras, the amount of image data is approximately 328 GB, and where the multi camera system 1 is formed from sixteen cameras, the amount of image data is approximately 656 GB.

In this manner, in the multi camera system 1, the four cameras 11-1 to 11-4 are required in order to monitor the region 21. Therefore, installation of the cameras is cumbersome, and the cost of the multi camera system 1 is high. Further, where high definition images are acquired, image pickup must be performed under a condition of a high image pickup magnification. Therefore, a greater number of cameras 11-1 to 11-4 are required. Further, where the number of the cameras 11-1 to 11-4 is not increased while it is intended to acquire high definition images, it is difficult to acquire high definition images regarding the entire region 21. Therefore, it is necessary for the operator to usually monitor normal images and designate a desired region to acquire a high definition image of the region.

Thus, a monitoring camera is available which can monitor a situation over a wide range by means of a single camera by successively picking up an image of an object while the photographing direction is successively shifted to obtain a panorama image of the entire object formed from a plurality of unit images.

SUMMARY OF THE INVENTION

However, with such a monitoring camera as just described, in order to produce an image of an entire subject, it is necessary to acquire all unit images which form the image of the entire subject, and much time is required to produce an image of the entire subject. Accordingly, it is difficult to completely capture any small variation in situation which occurs within a short period of time within a range of image pickup.

In particular, a moving body (moving subject) which moves at a high speed sometimes moves out of the range of image pickup in a period of time after an image of the entire image pickup range is acquired until a next image of the entire image pickup range is acquired.

Further, actually the monitoring camera picks up images also within a period of time within which it moves to a position at which it is to pick up an image of the moving body. Thus, the number of images picked up during movement of the monitoring camera to the position at which the monitoring camera can pick up an image of the moving body, that is, the number of images picked up while such a process as panning, tilting or zooming is performed, may possibly become greater than the number of images picked up while the moving body is captured by the monitoring camera. Therefore, the monitoring camera has a subject to be solved in that a great number of images which cannot be observed agreeably may be reproduced.

It is desirable to provide an information processing system, an information processing apparatus and method, and a program wherein an image of a predetermined region can be picked up and an image of moving bodies in the predetermined region can be picked up accurately.

According to an embodiment of the present invention, there is provided an information processing system including region image pickup means for picking up an image of a predetermined region, detection means for detecting, based on a region image obtained by the image pickup by the region image pickup means, any moving body existing in the predetermined region moving body image pickup means for picking up an image of the moving bodies detected by the detection means, calculation means for calculating an angle of view of each of the moving bodies detected by the detection means, angle-of-view information storage means for storing information of the individual angles of view of more than one of the moving bodies calculated by the calculation means, first moving body image pickup control means for controlling the image pickup by the moving body image pickup means based on the information of the angle of view of a particular one of the moving bodies from within the information of the angles of view of the moving bodies stored in the angle-of-view information storage means, and second moving body image pickup control means for controlling the image pickup by the moving body image pickup means based on the information of the angle of view of the particular moving body whose image pickup is controlled by the first moving body image pickup control means at a timing after the moving body image pickup means is controlled by the first moving body image pickup control means.

In the information processing system, an image of a predetermined region is picked up, and, based on a region image obtained by the image pickup, any moving body existing in the predetermined region is detected. Then, an image of the detected moving bodies is picked up, and an angle of view of each of the detected moving bodies is calculated. Further, information of the calculated individual angles of view of more than one of the moving bodies is stored, and the image pickup is controlled based on the information of the angle of view of a particular one of the moving bodies from within the stored information of the angles of view of the moving bodies. Then, the image pickup is controlled based on the information of the angle of view of the particular moving body whose image pickup is controlled at a timing after the image pickup is controlled.

According to another embodiment of the present invention, there is provided an information processing apparatus, including detection means for detecting, based on a region image obtained by image pickup of a predetermined region, any moving body existing in the predetermined region, calculation means for calculating an angle of view of each of the moving bodies detected by the detection means, angle-of-view information storage means for storing information of the individual angles of view of more than one of the moving bodies calculated by the calculation means, first moving body image pickup control means for controlling the image pickup by the moving body image pickup means based on the information of the angle of view of a particular one of the moving bodies from within the information of the angles of view of the moving bodies stored in the angle-of-view information storage means, and second moving body image pickup control means for controlling the image pickup of the moving bodies based on the information of the angle of view of the particular moving body at a timing after the image pickup of the moving bodies is controlled by the first moving body image pickup control means.

According to a further embodiment of the present invention, there is provided an information processing method including the steps of detecting, based on a region image obtained by image pickup of a predetermined region, any moving body existing in the predetermined region, calculating an angle of view of each of the moving bodies detected by the process at the detection step, storing information of individual angles of view of more than one of the moving bodies calculated by the process at the calculation step, controlling the image pickup of the moving bodies based on the information of the angle of view of a particular one of the moving bodies from within the information of the angles of view of the moving bodies stored by the process at the angle-of-view information storage step, and controlling the image pickup of the moving bodies based on the information of the angle of view of the particular moving body whose image pickup is controlled by the process at the first moving body image pickup control step at a timing after the image pickup of the moving bodies is controlled by the process at the first moving body image pickup control step.

According to a still further embodiment of the present invention, there is provided a program for causing a computer to execute a process including the steps of detecting, based on a region image obtained by image pickup of a predetermined region, any moving body existing in the predetermined region, calculating an angle of view of each of the moving bodies detected by the process at the detection step, storing information of individual angles of view of more than one of the moving bodies calculated by the process at the calculation step, controlling the image pickup of the moving bodies based on the information of the angle of view of a particular one of the moving bodies from within the information of the angles of view of the moving bodies stored by the process at the angle-of-view information storage step, and controlling the image pickup of the moving bodies based on the information of the angle of view of the particular moving body whose image pickup is controlled by the process at the first moving body image pickup control step at a timing after the image pickup of the moving bodies is controlled by the process at the first moving body image pickup control step.

In the information processing apparatus and method and the program, any moving body existing in a predetermined region is detected based on a region image obtained by image pickup of the predetermined region, and, an angle of view of each of the detected moving bodies is calculated. Further, information of the calculated individual angles of view of more than one of the moving bodies is stored, and image pickup of the moving bodies is controlled based on the information of the angle of view of a particular one of the moving bodies from within the stored information of the angles of view of the moving bodies. Then, the image pickup of the particular moving body is controlled based on the angle of view of the particular moving body whose image pickup is controlled at a timing after the image pickup of the particular moving body is controlled.

The information processing apparatus may be any of an independent apparatus and a block which performs information processing.

With the information processing system, information processing apparatus and method and program, an image of a moving body particularly in an image pickup region can be picked up accurately.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

Figure 4:
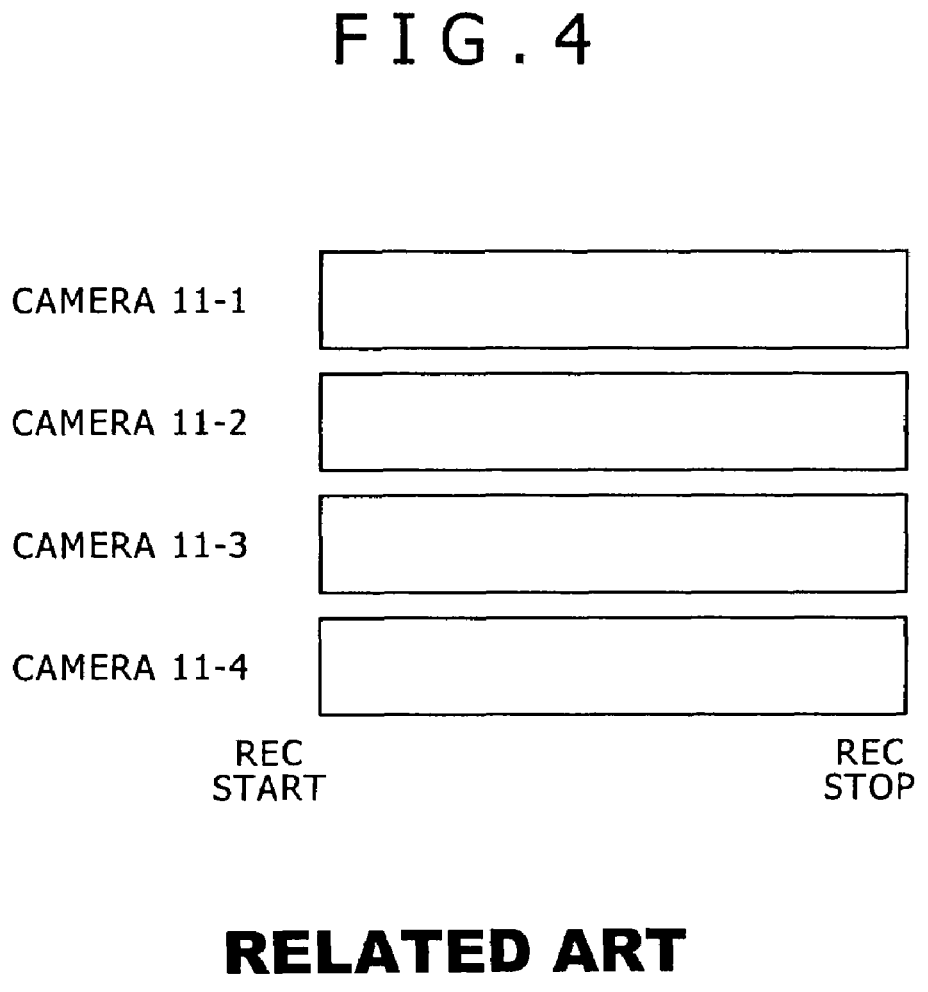

FIG. 4 is a diagrammatic view illustrating image data recorded in a recording apparatus shown in FIG. 2 or a PC shown in FIG. 3;

FIG. 8 is a block diagram showing an example of a functional configuration of the client PC shown in FIG. 6;

FIG. 9 is a view illustrating an example of moving body information registered in a moving body tracking order database shown in FIG. 8;

DETAILED DESCRIPTION OF THE PREFERRED EMBODIMENTS

Figure 1:
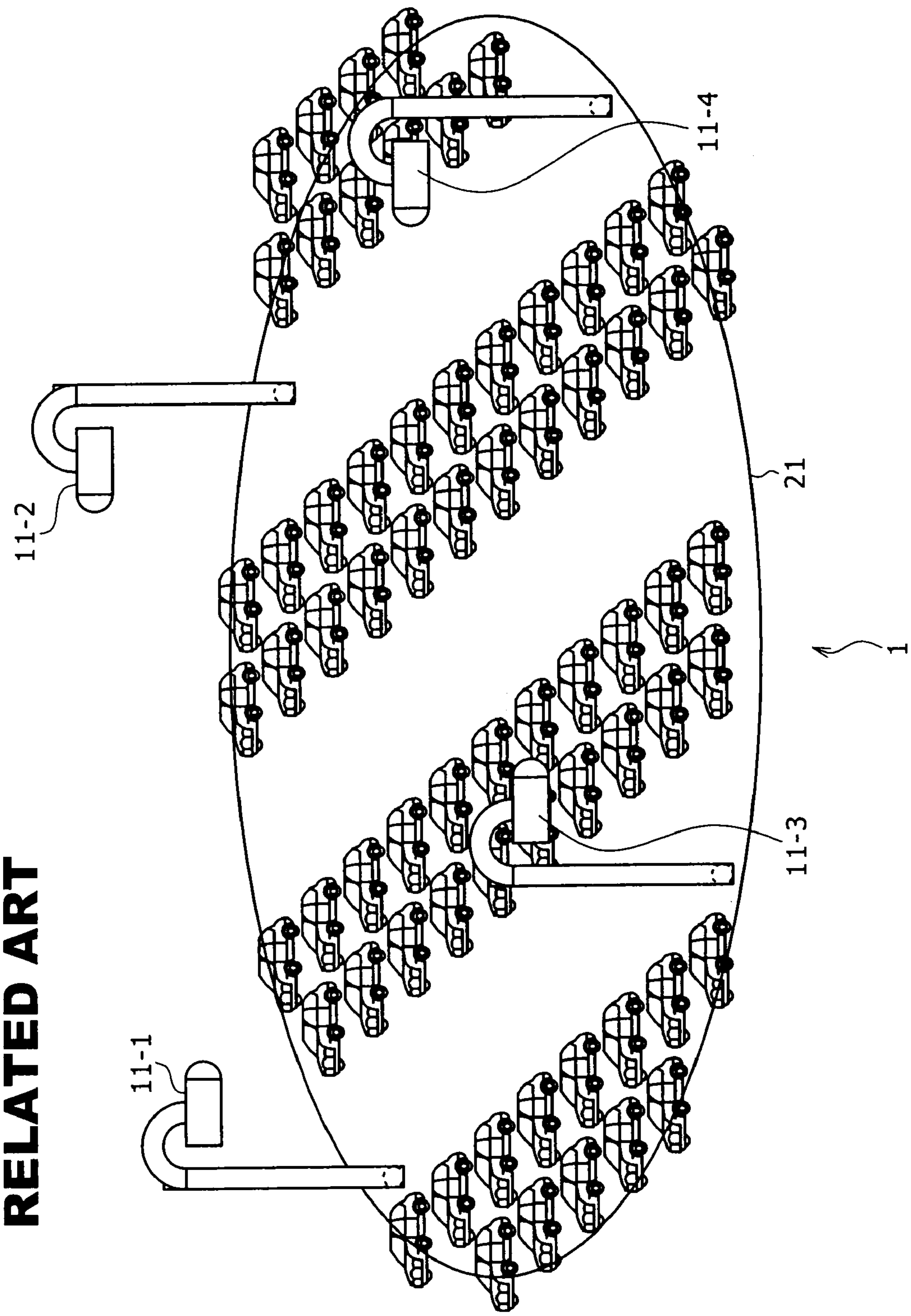
FIG. 1 is a schematic view showing an appearance of an example of a conventional multi camera system.
Figure 2:
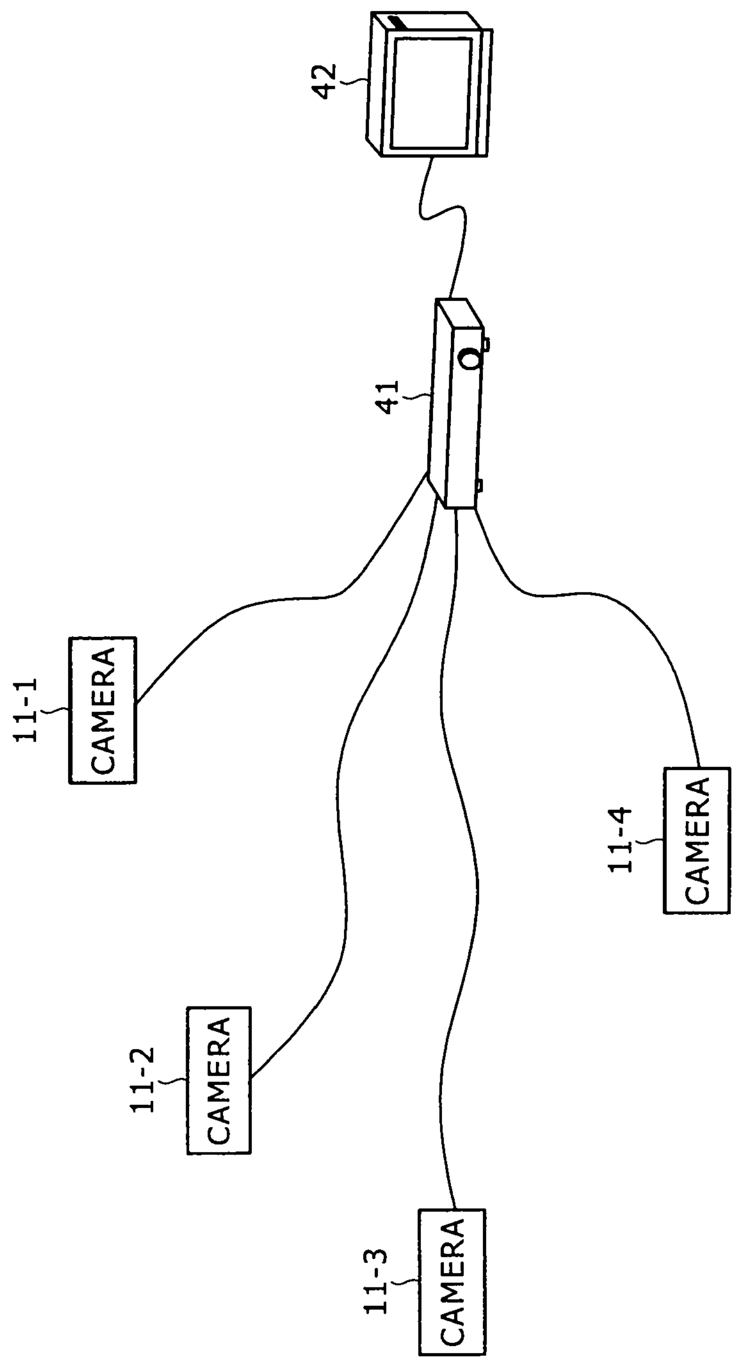
FIG. 2 is a schematic view showing an example of a configuration of the multi camera system of FIG. 1.
Figure 3:
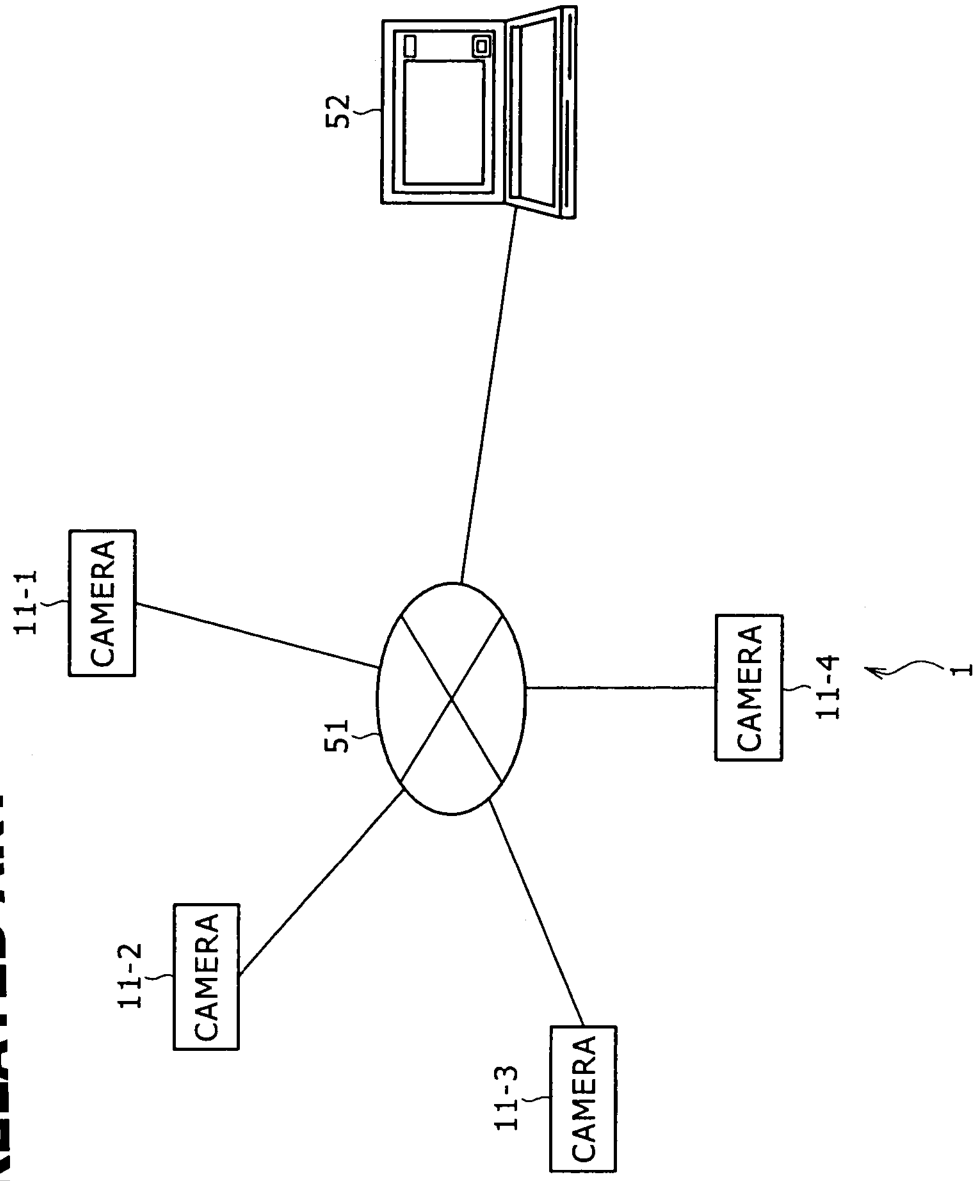
FIG. 3 is a similar view but showing another example of the configuration of the multi camera system of FIG. 1.

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the prevent invention corresponding to particular elements described in the embodiment of the present invention is all described in the claims. In other words, the following description does not deny the presence of an invention which corresponds to a particular element described in the description of the embodiment of the present invention but is not recited in the claims, that is, the description does not deny the presence of an invention which may be filed for patent in a divisional patent application or may be additionally included into the present patent application as a result of later amendment to the claims.

An information processing system according to the present invention includes region image pickup means (for example, a sensor camera 121 shown in FIG. 8) for picking up an image of a predetermined region, detection means (for example, a moving body detection module 303 shown in FIG. 8) for detecting, based on a region image obtained by the image pickup by the region image pickup means, any moving body existing in the predetermined region, moving body image pickup means for picking up an image of any of the moving bodies detected by the detection means, calculation means (for example, a calculation section 302*a* shown in FIG. 8) for calculating an angle of view of each of the moving bodies detected by the detection means, angle-of-view information storage means (for example, a moving body tracking order management DB 304 shown in FIG. 8) for storing information of individual angles of view of more than one of the moving bodies calculated by the calculation means, first moving body image pickup control means (for example, a tracking object pan tilt zoom module 305 shown in FIG. 8) for controlling the image pickup by the moving body image pickup means based on the information of the angle of view of a particular one of the moving bodies from within the information of the angles of view of the moving bodies stored in the angle-of-view information storage means, and second moving body image pickup control means (for example, an additional tracking object pan tilt module 306 shown in FIG. 8) for controlling the image pickup by the moving body image pickup means based on the information of the angle of view of the particular moving body whose image pickup is controlled by the first moving body image pickup control means at a timing after the moving body image pickup means is controlled by the first moving body image pickup control means.

An information processing apparatus according to the present invention includes detection means (for example, a moving body detection module 303 shown in FIG. 8) for detecting, based on a region image obtained by image pickup of a predetermined region, any moving body existing in the predetermined region, calculation means (for example, a calculation section 302*a* shown in FIG. 8) for calculating an angle of view of each of the moving bodies detected by the detection means, angle-of-view information storage means (for example, a moving body tracking order management DB 304 shown in FIG. 8) for storing information of individual angles of view of more than one of the moving bodies calculated by the calculation means, first moving body image pickup control means (for example, a tracking object pan tilt zoom module 305 shown in FIG. 8) for controlling the image pickup by the moving body image pickup means based on the information of the angle of view of a particular one of the moving bodies from within the information of the angles of view of the moving bodies stored in the angle-of-view information storage means, and second moving body image pickup control means (for example, an additional tracking object pan tilt module 306 shown in FIG. 8) for controlling the image pickup of the moving bodies based on the information of the angle of view of the particular moving body at a timing after the image pickup of the moving bodies is controlled by the first moving body image pickup control means.

The information processing apparatus may further include priority rank setting means (for example, a rank determination section 302*b* shown in FIG. 8) for setting, based on a predetermined condition, priority ranks to the information of individual angles of view of the moving bodies stored in the angle-of-view information storage means, the first moving body image pickup control means being operable to select the particular moving body in a descending order of the priority degree set by the priority rank setting means from within the information of the angles of view of the moving bodies stored in the angle-of-view information storage means and control the image pickup of the moving bodies based on the information of the angle of view of the selected moving body.

Figure 12:
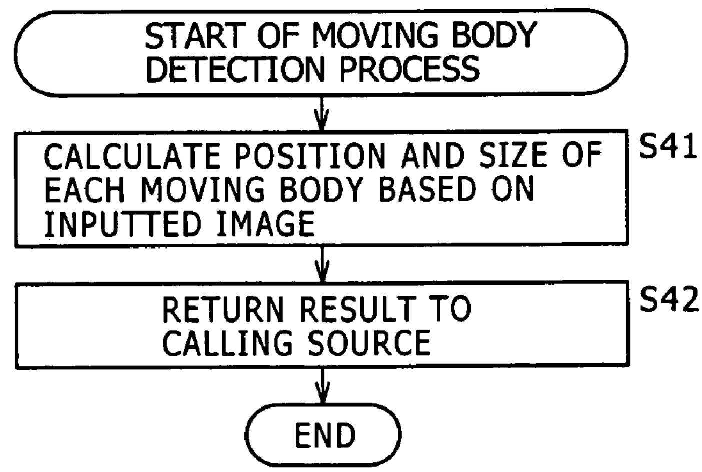
FIG. 12 is a flow chart illustrating a moving body detection process executed by a moving body detection module shown in FIG. 8.
Figure 13:
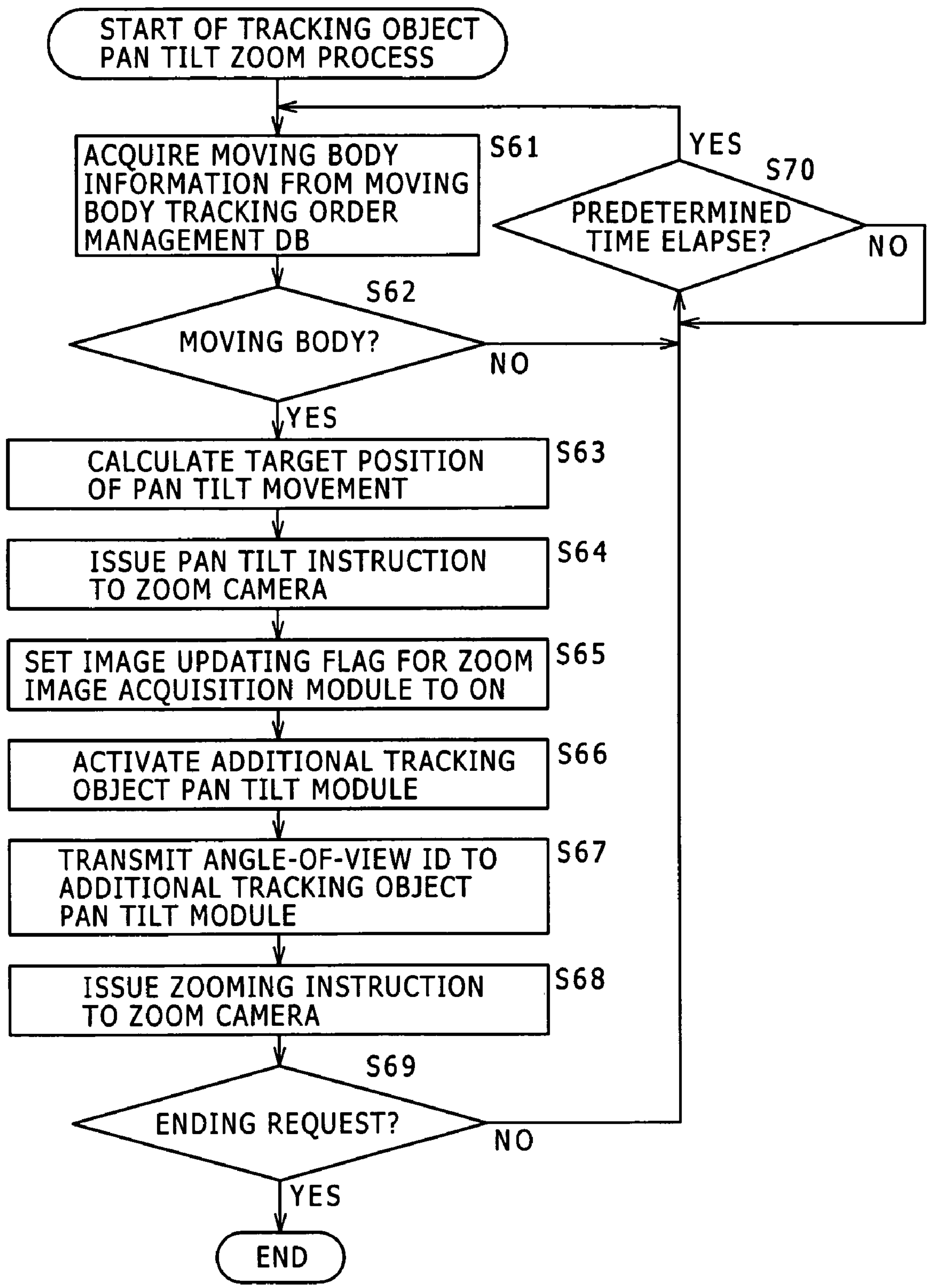
FIG. 13 is a flow chart illustrating a tracking object pan tilt zooming process executed by a tracking object pan tilt zoom module shown in FIG. 8.

An information processing method according to the present invention includes a detection step (for example, a process at step S41 of a flow chart of FIG. 12) of detecting, based on a region image obtained by image pickup of a predetermined region, any moving body existing in the predetermined region, a calculation step (for example, a process at step S23 of a flow chart of FIG. 11) of calculating an angle of view of each of the moving bodies detected by the process at the detection step, an angle-of-view information storage step (for example, a process at step S25 of the flow chart of FIG. 11) of storing information of individual angles of view of more than one of the moving bodies calculated by the process at the calculation step, a first moving body image pickup control step (for example, a process at steps S64 and S68 of a flow chart of FIG. 13) of controlling the image pickup of the moving bodies based on the information of the angle of view of a particular one of the moving bodies from within the information of the angles of view of the moving bodies stored by the process at the angle-of-view information storage step, and a second moving body image pickup control step (for example, a process at step S84 of a flow chart of FIG. 14) of controlling the image pickup of the moving bodies based on the information of the angle of view of the particular moving body whose image pickup is controlled by the process at the first moving body image pickup control step at a timing after the image pickup of the moving bodies is controlled by the process at the first moving body image pickup control step.

It is to be noted that a program according to the present invention includes steps similar to those of the information processing method described above, and overlapping description thereof omitted herein to avoid redundancy.

In the following, a particular embodiment of the present invention is described in detailed with reference to the accompanying drawings.

Figure 5:
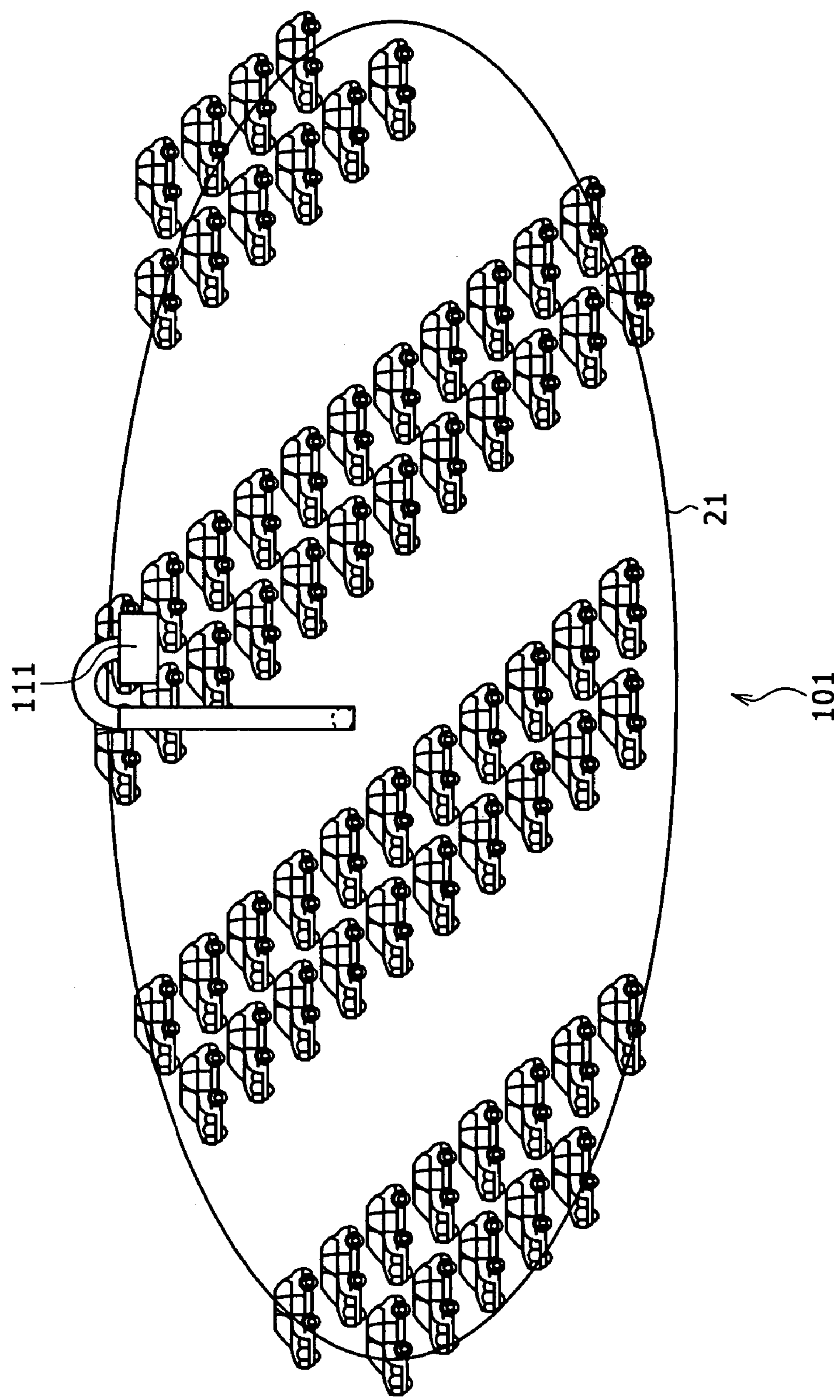
FIG. 5 is a view showing an example of a configuration of a monitoring system to which the present invention is applied.

FIG. 5 shows an example of an appearance of a monitoring system 101 to which the present invention is applied.

Figure 6:
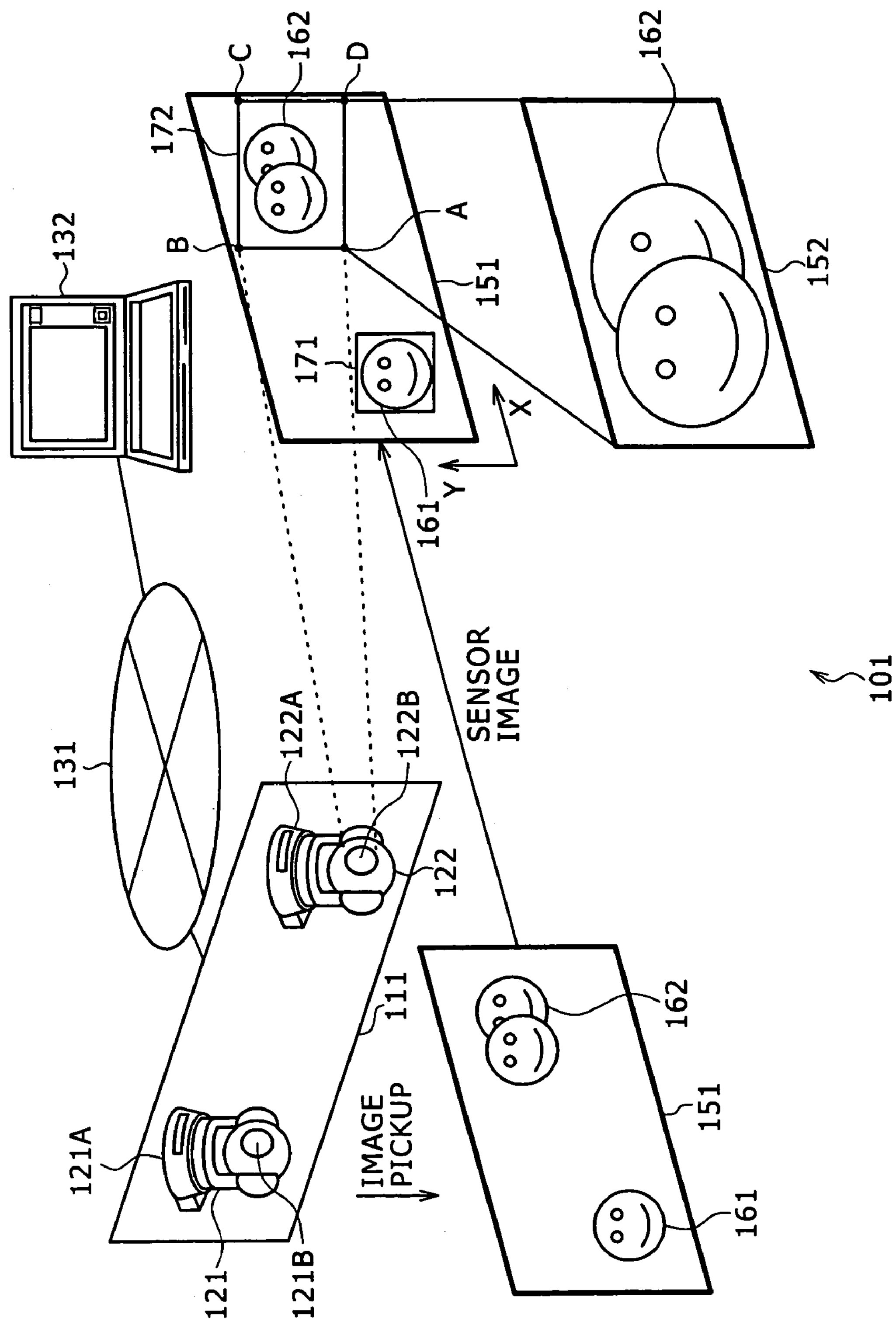
FIG. 6 is a schematic view showing a configuration of the monitoring system shown in FIG. 5.

Referring to FIG. 5, the monitoring system 101 shown includes a camera unit 111. Referring to FIG. 6, the camera unit 111 includes a sensor camera 121 for picking up a region of a wide area, and a zoom camera 122 for picking up an image of a predetermined moving body in a zoomed (enlarged) state. The sensor camera 121 picks up an image of a region of a wide area, and the zoom camera 122 zooms and picks up an image of a moving body detected from within a sensor image 151 obtained by the image pickup by the sensor camera 121. Consequently, according to the monitoring system 101, for example, where it is provided in a parking area, a region 21 of a cylindrical wide area, for example, of a diameter of about 40 m in a parking area can monitored.

As a result, the monitoring system 101 shown in FIG. 5 requires a reduced number of cameras when compared with the multi camera system 1 shown in FIG. 1 and can be installed readily and produced at a reduced cost.

Naturally, the configuration of the monitoring system 101 of FIG. 5 is a mere example and may be modified such that, for example, the magnification factor of the zoom camera 122 is enhanced to expand the range of monitoring or an additional zoom camera or cameras are provided additionally so that images of a higher definition can be acquired.

FIG. 6 shows an example of a configuration of the monitoring system 101.

Referring to FIG. 6, the monitoring system 101 includes a camera unit 111 which includes a sensor camera 121 and a zoom camera 122, a network 131, and a client PC 132. The monitoring system 101 records a sensor image 151 acquired by the sensor camera 121 and a zoom image 152 obtained by image pickup by means of the zoom camera 122 into the client PC 132 through the network 131 and reproduces the thus recorded sensor image 151 and zoom image 152 by means of the client PC 132.

The sensor camera 121 of the camera unit 111 includes a pan tilt section 121A and a camera section 121B which are formed as a unitary member. The pan tilt section 121A is formed as a rotatable table for changing the image pickup direction freely, for example, with regard to two axes for panning and tilting (horizontal direction and vertical direction). The camera section 121B is disposed on the rotatable table which forms the pan tilt section 121A and controls the pan tilt section 121A under the control of the client PC 132 to adjust the horizontal or vertical direction of the image pickup direction and change the angle of view of image pickup to expand or reduce the image pickup magnification to pick up an image of (a subject of) a wide area as moving pictures. In particular, for example, the camera section 121B successively shifts the image pickup direction to pick up an image of a subject thereby to acquire a plurality of unit images and produces a sensor image 151 of a panorama image composed of the plural unit images. Accordingly, the sensor camera 121 may be any camera only if it has an image pickup function of picking up an omnidirectional image, and, for example, a panorama camera may be used therefor.

The camera section 121B supplies the sensor image 151 obtained by the image pickup to the client PC 132 through the network 131. In FIG. 6, the sensor camera 121 picks up an image of a wide area including moving bodies 161 and 162 to acquire a sensor image 151 in which the moving bodies 161 and 162 are included.

The zoom camera 122 includes a pan tilt section 122A and a camera section 122B which are formed as a unitary member similarly to the sensor camera 121. The pan tilt section 122A is formed as a rotatable table for changing the image pickup direction freely, for example, with regard to the two axes for panning and tilting similarly as in the pan tilt section 121A. The camera section 122B is disposed on the rotatable table which forms the pan tilt section 121A and controls the pan tilt section 122A under the control of the client PC 132 to adjust the horizontal or vertical direction of the image pickup direction and change the angle of view of image pickup to increase or decrease the image pickup magnification to pick up a predetermined moving body as zoomed moving pictures.

The client PC 132 detects the moving bodies 161 and 162 included in the sensor image 151 supplied thereto from the sensor camera 121 and determines a predetermined region (for example, a rectangular region) surrounding each of the moving bodies 161 or 162 as a moving body framework 171 or 172.

The client PC 132 supplies, for example, coordinates of the four vertices A to D of the moving body framework 172 (vertices A to D of a quadrangular moving body framework) on the X axis (axis in the horizontal direction in FIG. 6) and the Y axis (axis in the vertical direction) on the sensor image 151 to the zoom camera 122. The zoom camera 122 performs zoom image pickup of (the moving body framework 172 of) the moving body 162 based on the coordinates to acquire the zoom image 152. It is to be noted that, in the following description, the sensor image 151 and the zoom image 152 are acquired in a unit of a frame. The zoom camera 122 supplies the zoom image 152 to the client PC 132 through the network 131.

The network 131 is a communication network which allows bidirectional communication of data and may be, for example, the Internet network connected through a telephone circuit to the client PC 132 or an ISDN (Integrated Services. Digital Network)/B (broadband)-ISDN, a LAN (Local Area Network) or the like connected to a TA (Terminal Adapter) or a modem.

The client PC 132 is formed, for example, from a personal computer and controls the sensor camera 121 and the zoom camera 122 through the network 131. Further, the client PC 132 reproduces a sensor image 151 from the sensor camera 121 and a zoom image 152 from the zoom camera 122 and reproduces the recorded sensor image 151 and zoom image 152 so as to be displayed.

Figure 7:
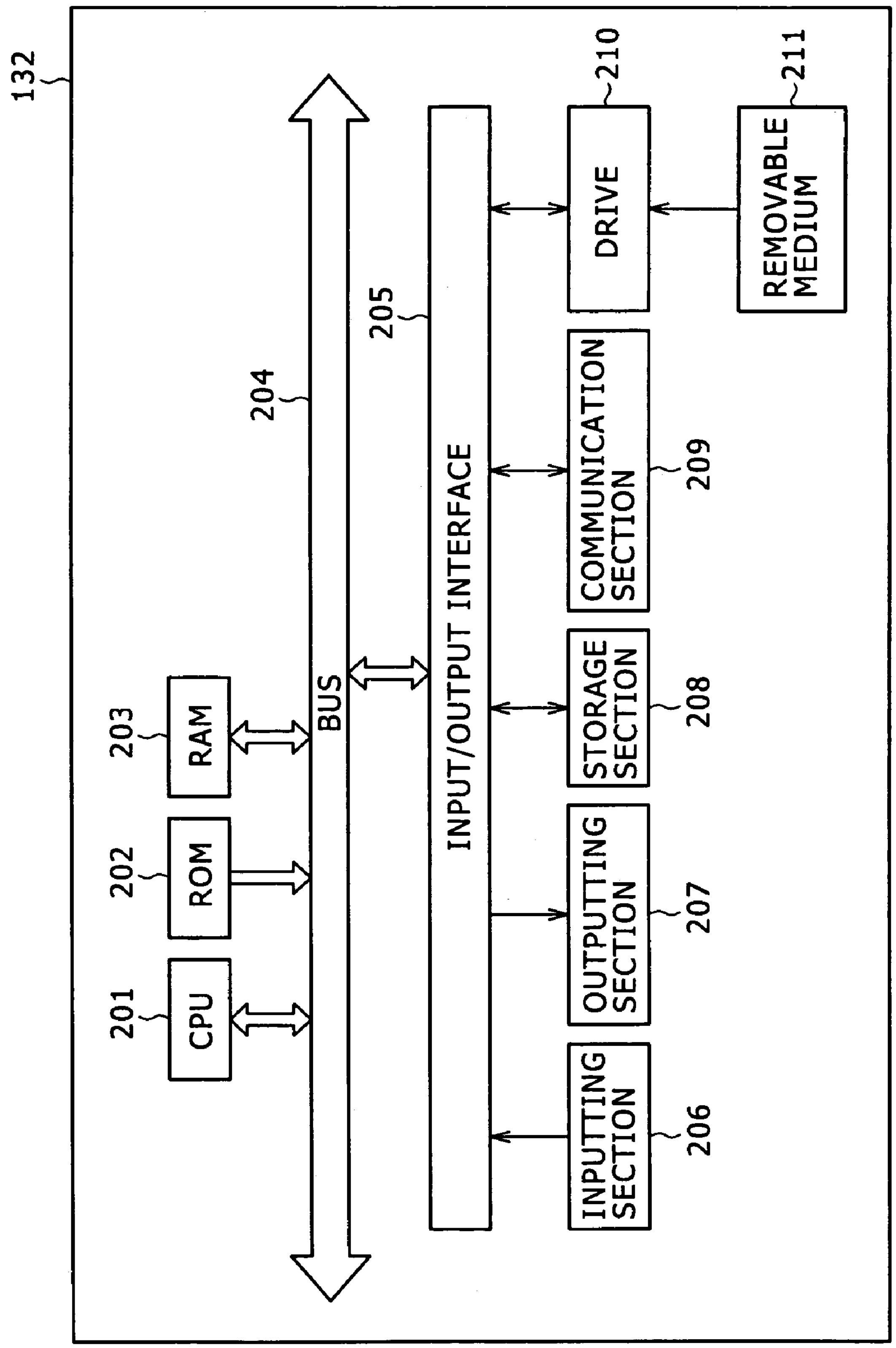
FIG. 7 is a block diagram showing an example of a configuration of a client PC shown in FIG. 6.

FIG. 7 is a block diagram showing an example of a configuration of the client PC 132 shown in FIG. 6.

Referring to FIG. 7, a central processing unit (CPU) 201 is connected to a read only memory (ROM) 202 and a random access memory (RAM) 203 through a bus 204. Also an input/output interface 205 is connected to the bus 204.

The CPU 201 executes various processes in accordance with a program stored in the ROM 202 or a program stored in the RAM 203. The ROM 202 has various programs stored therein. The RAM 203 stores a program acquired through a communication section 209. Further, the RAM 203 suitably stores data and so forth necessary for the CPU 201 to execute various processes.

An inputting section 206 including a keyboard, a mouse, a microphone and so forth, an outputting section 207 including an liquid crystal display (LCD) unit, a speaker and so forth, a storage section 208 formed from a hard disk and so forth and a communication section 209 formed from a TA, a modem or the like are connected to the input/output interface 205. The communication section 209 is connected to the network 131 of FIG. 6 and communicates with the sensor camera 121 and the zoom camera 122 through the network 131.

A drive 210 is suitably connected the input/output interface 205 as occasion demands, and a program is read out from a removable medium 211 loaded in the drive 210 and installed into the storage section 208. The CPU 201 loads the program installed in the RAM 203, for example, into the RAM 203 and executes the program.

FIG. 8 is a block diagram showing an example of a functional configuration of the client PC 132 shown in FIG. 6.

Referring to FIG. 8, the client PC 132 shown includes a sensor image acquisition module 301, an image pickup angle-of-view calculation module 302, a moving body detection module 303, a tracking object pan tilt zoom module 305, an additional tracking object pan tilt module 306, a zoom image acquisition module 307, a result displaying module 308, and a timer module 309, which are program modules executed, for example, by the CPU 201 shown in FIG. 7. The client PC 132 further includes a moving body tracking order management DB 304 which corresponds, for example, to the storage section 208 shown in FIG. 7.

Further, each of the modules indicated by blocks in FIG. 8 may be considered as hardware (for example, chip set) having a single function. In particular, FIG. 8 may be considered as a software function block diagram or as a hardware block diagram in which a function is provided for each of the modules.

An instruction to acquire a sensor image 151 is supplied from the inputting section 206 in response to an operation by the user to the sensor image acquisition module 301, and the sensor camera 121 is controlled in accordance with the instruction. The sensor camera 121 picks up an image of the wide area region 21 under the control of the sensor image acquisition module 301 and supplies a sensor image 151 obtained by the image pickup and an ID (hereinafter referred to as camera ID) which represents the sensor camera 121 itself and is unique to the sensor camera 121 to the sensor image acquisition module 301. The sensor image acquisition module 301 supplies the sensor image 151 from the sensor camera 121 to the image pickup angle-of-view calculation module 302 and the result displaying module 308.

The image pickup angle-of-view calculation module 302 supplies the sensor image 151 supplied thereto from the sensor image acquisition module 301 to the moving body detection module 303 to cause the moving body detection module 303 to calculate the position and the size of an image of each moving body picked up in the sensor image 151 and supply a result of the calculation.

A calculation section 302*a* of the image pickup angle-of-view calculation module 302 recognizes, based on the information from the moving body detection module 303, the position of that one of frames of the sensor image 151 in which appearance of the moving body is detected from the top frame of the sensor image 151 as a reproduction starting position when the sensor image 151 corresponding to the moving body is to be reproduced. Further, the image pickup angle-of-view calculation module 302 determines, for example, a quadrangular moving body framework 172 (171) in which the moving body whose appearance is detected is captured. Then, the image pickup angle-of-view calculation module 302 calculates the coordinates of the vertices A to D of the moving body framework 172 as the appearance position (angle of view) of the moving body and applies an angle-of-view ID to each appearance position. Further, the image pickup angle-of-view calculation module 302 produces moving body information formed from the appearance date and time, disappearance date and time and appearance position of the moving body, the angle-of-view ID, the reproduction starting position, and the camera ID supplied from the sensor camera 121 based on the date and time information supplied from the timer module 309 and representing the date and time at present. Further, a rank determination section 302*b* reads out the moving body tracking order management DB 304 and determines and registers moving body tracking ranks into the moving body tracking order management DB 304 together with the information reproduced as described above (where moving body information is registered before the registration by the rank determination section 302*b*, the order of the moving body information is rearranged and updated including the moving body information before that time).

The tracking object pan tilt zoom module 305 controls pan tilt zooming of the zoom camera 122 at predetermined intervals of time based on the information of the moving body tracking order management DB 304 and selects an angle-of-view ID whose tracking rank is highest from among moving bodies which image is not picked up as yet. Then, the tracking object pan tilt zoom module 305 causes the zoom camera 122 to pick up a zoom image of the moving body in accordance with an angle of view corresponding to the selected appearance position information and supply the picked up image to the zoom image acquisition module 307. Thereafter, the tracking object pan tilt zoom module 305 repetitively performs the processes just described.

The additional tracking object pan tilt module 306 acquires the latest appearance position information corresponding to the angle-of-view ID selected by the tracking object pan tilt zoom module 305 at predetermined intervals of time sufficiently shorter than that in the process by the tracking object pan tilt zoom module 305 after the zoom camera 122 is controlled by the tracking object pan tilt zoom module 305 to start the image pickup. Then, the additional tracking object pan tilt module 306 controls the zoom camera 122 to pick up a zoom image of the moving body in accordance with an angle of view corresponding to the acquired appearance position information and supply the picked up image to the zoom image acquisition module 307. Thereafter, the additional tracking object pan tilt module 306 repetitively performs the processes just described.

In particular, while the tracking object pan tilt zoom module 305 controls the pan tilt zooming of the zoom camera 122 with one angle of view for one angle-of-view ID (the pan tilt zooming is performed only once for each one of the angle-of-view IDs), the additional tracking object pan tilt module 306 controls the pan tilt zooming of the zoom camera 122 with a plurality of angles of view for one angle-of-view ID at intervals of time sufficiently shorter than those in the process by the tracking object pan tilt zooming module 305.

The zoom image acquisition module 307 is controlled between on and off by the tracking object pan tilt zoom module 305 and the additional tracking object pan tilt module 306 and acquires and supplies a zoom image supplied from the zoom camera 122 to the result displaying module 308.

The result displaying module 308 acquires the zoom image supplied from the zoom image acquisition module 307 and a sensor image supplied from the sensor image acquisition module 301 and causes a display unit not shown to display the acquired images.

The timer module 309 measures the date and time at present and supplies date and time information which represents the measured date and time to the sensor image acquisition module 301, tracking object pan tilt zoom module 305 and additional tracking object pan tilt module 306.

Now, the moving body information registered in the moving body tracking order management DB 304 shown in FIG. 8 is described with reference to FIG. 9.

As seen in FIG. 9, the moving body tracking order management DB 304 includes information of the (tracking) rank, appearance date and time, disappearance date and time and appearance position of a moving body, angle-of-view ID, reproduction starting position, and camera ID. In the moving body tracking order management DB 304, a file is produced for each management time zone. It is to be noted that the management time zone in the following description is defined as a unit of one hour when one day is delimited by one hour in order from 9:00 (nine o'clock) for each date. However, the definition of the management time zone is not limited to this.

Further, FIG. 9 illustrates an example of the moving body tracking order management information registered in a file for the management time zone from 10:00 to 11:00 of Jan. 10, 2004 in the moving body tracking order management DB 304. As seen in FIG. 9, the image pickup angle-of-view calculation module 302 detects disappearance of the moving body, whose appearance is detected at 10:00 of Jan. 10, 2004 and to which the angle-of-view ID "1" is applied, at 11:00 of the same day. Further, the image pickup angle-of-view calculation module 302 determines a moving body framework (for example, the moving body framework 171 or 172 shown in FIG. 6) of the moving body whose angle-of-view ID is "1" and recognizes the coordinates (1, 2), (1, 5), (2, 5) and (2, 2) of the vertices A to D of the moving body framework as an appearance position.

Further, the frame of the sensor image 151 in which the appearance of the moving body whose angle-of-view ID is "1" is detected is the frame #1 which is the first frame from the top of the frames, and the image pickup angle-of-view calculation module 302 recognizes the frame #1 as a reproduction starting position. It is to be noted that, in the following description, the first frame from the top of frames is referred to as frame #1. Further, the image pickup angle-of-view calculation module 302 receives "1" supplied thereto as the camera ID of the sensor camera 121 by which the sensor image 151 in which the appearance of the moving body whose moving body ID is "1" is detected is acquired.

Further, the image pickup angle-of-view calculation module 302 detects disappearance of the moving body, whose appearance is detected at 10:05 of Jan. 10, 2004 and to which the angle-of-view ID "2" is applied, at 10:30 of the same day. The image pickup angle-of-view calculation module 302 determines a moving body frame (for example, the moving body framework 171 or 172 shown in FIG. 6) of the moving body whose angle-of-view ID is "2" and recognizes the coordinates (3, 5), (3, 9), (5, 9) and (5, 5) of the vertices A to D of the moving body frame as an appearance position.

Furthermore, the frame of the sensor image 151 in which the appearance of the moving body whose angle-of-view ID is "2" is detected is the frame #2, and the image pickup angle-of-view calculation module 302 recognizes the frame #2 as a reproduction starting position. Further, the sensor image acquisition module 301 receives "1" supplied thereto as the camera ID of the sensor camera 121 by which the sensor image 151 in which the appearance of the moving body whose angle-of-view ID is "2" is detected is acquired.

Further, in FIG. 9, the tracking rank of the moving body of the angle-of-view ID=1 is set to the first rank by the rank determination section 302*b*, and the tracking rank of the moving body of the angle-of-view ID=2 is set to the second rank.

It is to be noted that the rank determination section 302*b* determines ranks of moving bodies with reference to priority conditions such as the context of points of time at which moving bodies move, the position of the angle of view of the moving body in the sensor image (for example, an angle of view displayed at an upper position in the sensor image is selected with priority), the size of the moving body in the sensor image (for example, an image of a moving body having a comparatively large size from among the moving bodies displayed in the sensor image is selected with priority), or the aspect ratio of the moving body.

In other words, by arranging moving bodies in accordance with various conditions for the priority ranks, a moving body to be captured preferentially can be captured easily.

For example, where the camera is placed at a comparatively low position (2 to 3 m) in a room in order to preferentially capture a moving body at a comparatively high position in the sensor image, the face of the human being can be easily captured because it exists at a high position.

However, where the camera is placed at a high position (10 m or more) such as, for example, on a roof of a building in open-air in order to preferentially capture a moving body at a lower position in the sensor image, movement of a human being, a car or the like comparatively near to the camera can be captured rather than the sky, a high position of the building or the like.

Further, if a moving body of a large size in the sensor image is captured preferentially, then a moving body near to the camera (as the moving body comes nearer to the sensor camera 122, the size of the image of the moving body captured by the sensor camera 122 becomes larger) can be captured preferentially when compared, for example, with a moving body positioned remotely from the camera.

Further, if a moving body of a small size in the sensor image is captured preferentially, then movement of a human being, a car or the like positioned remotely from the camera can be captured preferentially when compared with the movement of a moving body positioned near to the camera.

Further, if a vertically elongated moving body in the sensor image is captured preferentially, then a human being can be easily captured. In particular, where a human being is walking and the constitution of the human being looks, the human being can be easily captured as a vertically elongated moving body in the sensor image of the sensor camera 122.

Figure 10:
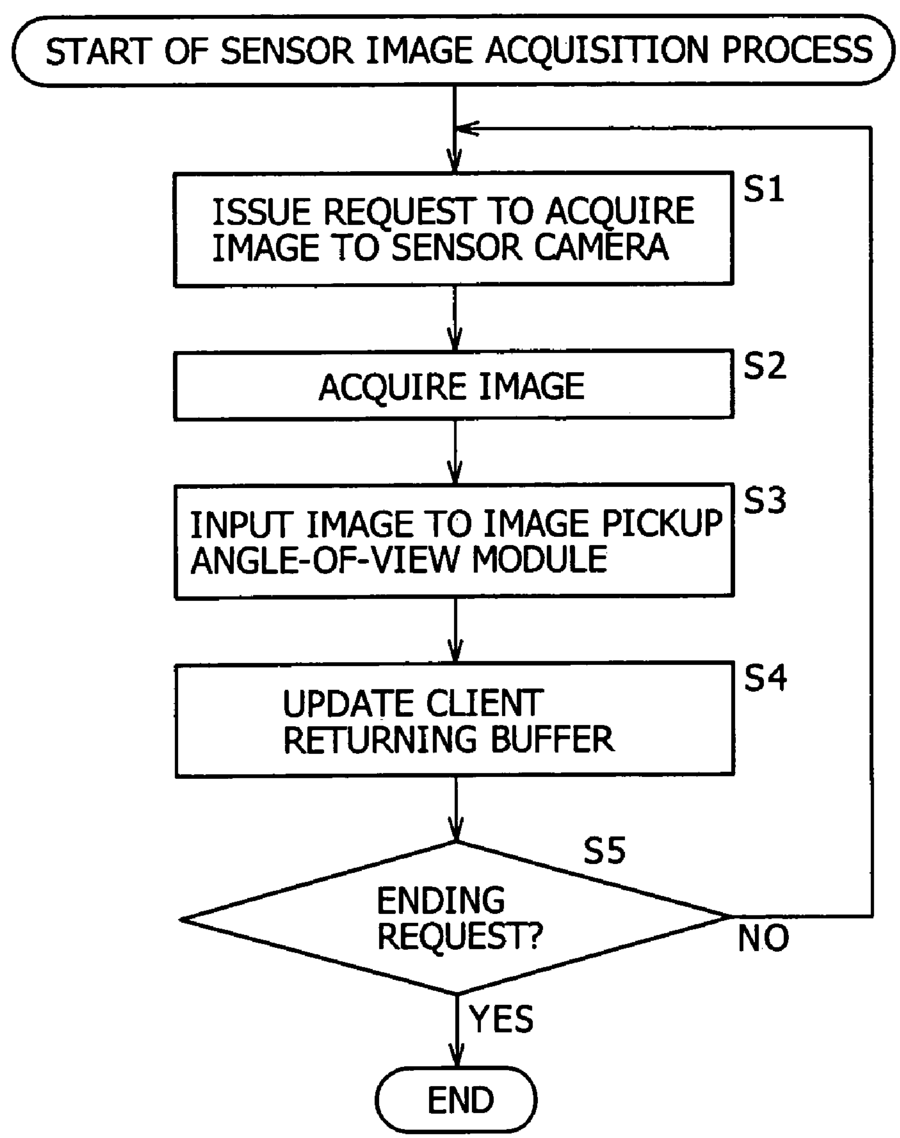
FIG. 10 is a flow chart illustrating a sensor image acquisition process executed by a sensor image acquisition module shown in FIG. 8.

Now, a sensor image acquisition process by the sensor image acquisition module 301 shown in FIG. 8 is described with reference to FIG. 10. The sensor image acquisition process is performed when the user operates the inputting section 206 to issue an instruction to acquire a sensor image 151.

At step S1, the sensor image acquisition module 301 issues a request for acquisition of a sensor image 151 to the sensor camera 121. The camera section 122A of the sensor camera 121 controls the pan tilt section 121A to adjust the horizontal direction or the vertical direction of the image pickup direction and pick up an image of a region of a wide area as moving pictures at a predetermined image pickup ratio. The sensor camera 121 supplies the sensor image 151 and the camera ID of the sensor camera 121 to the sensor image acquisition module 301 in response to the request from the sensor image acquisition module 301.

After the process at step S1, the processing advances to step S2. At step S2, the sensor image acquisition module 301 acquires the sensor image 151 and the camera ID from the sensor camera 121. Thereafter, the processing advances to step S3. At step S3, the sensor image acquisition module 301 inputs the sensor image 151 and the camera ID from the sensor camera 121 to the moving body detection module 303. Thereafter, the processing advances to step S4.

At step S4, the sensor image acquisition module 301 updates a client returning buffer of the sensor camera 121. Thereafter, the processing advances to step S5. At step S5, the sensor image acquisition module 301 decides whether or not a request to end the acquisition of the sensor image 151 and the zoom image 152 is issued from the inputting section 206, that is, whether or not the user operates the inputting section 206 to issue an instruction to end the processing. If it is decided that a request to end the processing is not issued, then the processing returns to step S1 so that the processes described are repetitively performed.

On the other hand, if it is decided at step S5 that a request to end the processing is issued from the inputting section 206, and then the processing is ended.

Now, an image pickup angle-of-view calculation process by the image pickup angle-of-view calculation module 302 is described with reference to FIG. 11.

At step S21, the image pickup angle-of-view calculation module 302 supplies the sensor image supplied thereto from the sensor image acquisition module 301 to the moving body detection module 303.

At this time, the moving body detection module 303 executes a moving body detection process.

Here, the moving body detection process by the moving body detection module 303 is described with reference to a flow chart of FIG. 12.

At step S41, the moving body detection module 303 calculates the position and the size of each moving body based on the sensor image inputted thereto.

At step S42, the moving body detection module 303 returns information of the position and the size of the moving body calculated based on the inputted sensor image to the image pickup angle-of-view calculation module 302 from which the inputted sensor image is received.

Figure 11:
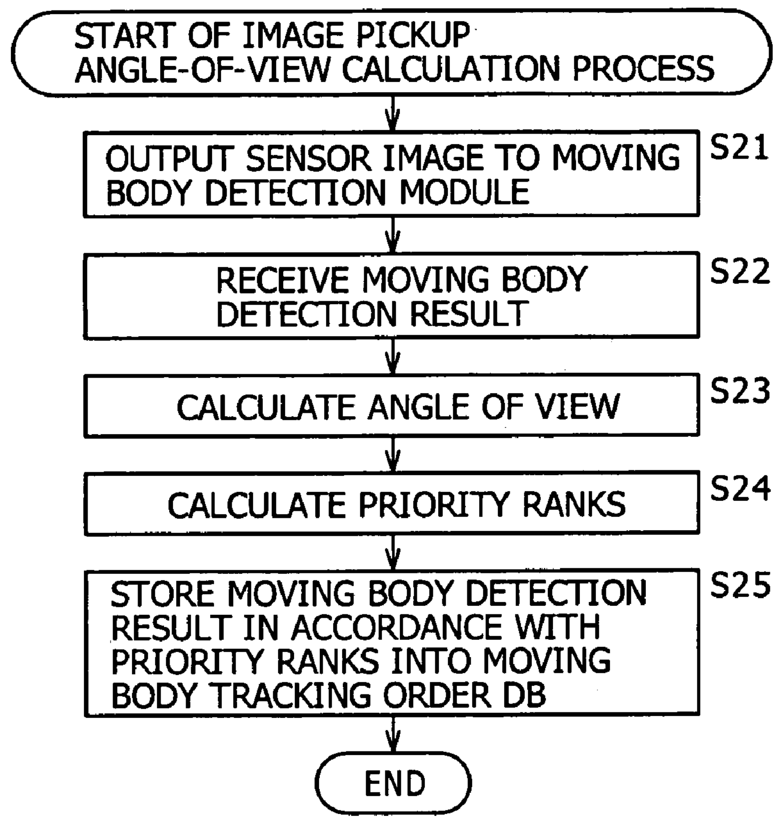
FIG. 11 is a flow chart illustrating an image pickup angle-of-view calculation process executed by an image pickup angle-of-view calculation module shown in FIG. 8.

Referring back to the flow chart of FIG. 11, at step S22, the image pickup angle-of-view calculation module 302 receives the information of the positions and the sizes of all of the moving bodies supplied thereto from the moving body detection module 303.

At step S23, the image pickup angle-of-view calculation module 302 causes the calculation section 302*a* to calculate, based on the information of the position and the size of the moving bodies, the angle of view of each moving body, that is, the coordinates of the vertices A to D of the moving body framework of each moving body (for example, the moving body framework 171 or 172 shown in FIG. 6) as the appearance position (angle of view) of the moving body. At this time, the calculation section 302*a* calculates one angle of view with regard to a plurality of moving bodies which can be integrated with each other in the sensor image. Or, where the angle of view of a moving body corresponding to any angle-of-view ID registered in advance in the moving body tracking order management DB 304 is to be determined, the calculation section 302*a* calculates the angle of view of each moving body such that the registered angle-of-view ID is succeeded.

At step S24, the image pickup angle-of-view calculation module 302 reads out the information in the moving body tracking order management DB 304 and controls the rank determination section 302*b* to determine the tracking ranks including the angles of view calculated in the present cycle. It is to be noted that the tracking ranks can be set in advance with regard to a characteristic or characteristics of a moving body to be captured preferentially as described hereinabove, and the tracking ranks are determined so as to satisfy such conditions as the context of points of time at which moving bodies move, the position of the angle of view of the moving body in the sensor image, the size of the moving body in the sensor image, or the aspect ratio of the moving body.

At step S25, the image pickup angle-of-view calculation module 302 applies angle-of-view IDs, as the appearance position of each of the moving bodies, to the coordinates to which four angles of view of each of the calculated moving body frameworks are to be set. Further, the image pickup angle-of-view calculation module 302 produces moving body information including the appearance date and time, disappearance date and time and appearance position of the moving body, the angle-of-view ID, the reproduction starting position, and the camera ID supplied from the sensor camera 121. Then, the image pickup angle-of-view calculation module 302 stores the moving body information into the moving body tracking order management DB 304 (where moving body information is stored already, the moving body information is updated).

The sensor image acquisition process, image pickup angle-of-view calculation process and moving body detection process described above are repetitively performed after every predetermined interval of time by the sensor image acquisition module 301, image pickup angle-of-view calculation module 302 and moving body detection module 303, respectively. Consequently, the latest moving body information is normally stored into the moving body tracking order management DB 304. It is to be noted that preferably the predetermined interval of time after which the sensor image acquisition process, image pickup angle-of-view calculation process and moving body detection process are repetitively performed is shorter than the interval of time after which a tracking object pan tilt zooming process and an additional tracking object pan tilt process are performed.

Now, the tracking object pan tilt zooming process by the tracking object pan tilt zoom module 305 is described with reference to a flow chart of FIG. 13.

At step S61, the tracking object pan tilt zoom module 305 reads out the moving body information stored in the moving body tracking order management DB 304, and decides whether or not a moving body exists in the sensor image at step S62. In particular, it is decided that a moving body corresponding to an angle-of-view ID with regard to which, for example, disappearance time included in the moving body information is set does not exist in the sensor image. Therefore, if disappearance time is set for all of the angle-of-view IDs within the moving body information, then it is decided that no moving body exists. In this instance, the processing advances to step S70.

On the other hand, if disappearance time corresponding to some angle-of-view ID is not set, then it is decided that the moving body exists, and the processing advances to step S63.

At step S63, the tracking object pan tilt zoom module 305 calculates the position at which the zoom camera 122 is to be pan-tilted, that is, values (pan-tilt values) of an elevation angle in the vertical direction and a depression angle in the horizontal direction to which the zoom camera 122 is to be controlled based on the information of the appearance position, within the moving body information, which is angle-of-view information and which corresponds to an unprocessed angle-of-view ID whose priority rank is highest.

At step S64, the tracking object pan tilt zoom module 305 controls the zoom camera 122 based on the pan-tilt values calculated in the process at step S63 to perform a pan tilt movement. At this time, the camera section 122B of the zoom camera 122 controls the pan tilt section 122A in accordance with the request and sets the zoom camera 122 to the requested elevation angle and depression angle.

At step S65, the tracking object pan tilt zoom module 305 sets an image updating flag for the zoom image acquisition module 307 to ON. In other words, by the process just described, the zoom image acquisition module 307 is placed into a state wherein it can acquire the image from the zoom camera 122.

At step S66, the tracking object pan tilt zoom module 305 activates the additional tracking object pan tilt module 306 hereinafter described.

At step S67, the tracking object pan tilt zoom module 305 transmits the angle-of-view ID being currently processed thereby to the additional tracking object pan tilt module 306.

At step S68, the tracking object pan tilt zoom module 305 calculates the magnification based on the information of the appearance position which is information of the angle of view of the angle-of-view ID and issues a zooming instruction to the zoom camera 122.

At step S69, the tracking object pan tilt zoom module 305 decides whether or not a request to end the processing is issued. If it is not decided that an instruction to end the processing is issued, then the processing advances to step S70.

At step S70, the tracking object pan tilt zoom module 305 decides whether or not a predetermined period of time elapses, and repeats the decision until after it becomes decided that the predetermined time elapses. In other words, the tracking object pan tilt zoom module 305 remains in a standby state until after the predetermined period of time elapses. Then, when it is soon decided at step S70 that the predetermined period of time elapses, the processing returns to step S61 to repeat the processes at the steps beginning with the step S61.

On the other hand, if it is decided at step S69 that an instruction to end the processing is issued, and then the processing is ended.

By the processes described above, presence/absence of a moving body is detected at the predetermined intervals of time, and as far as a moving body or bodies exist, the pan tilt values are set in the descending order of the priority degree for the moving bodies so that an image of the moving bodies can be picked up successively.

Figure 14:
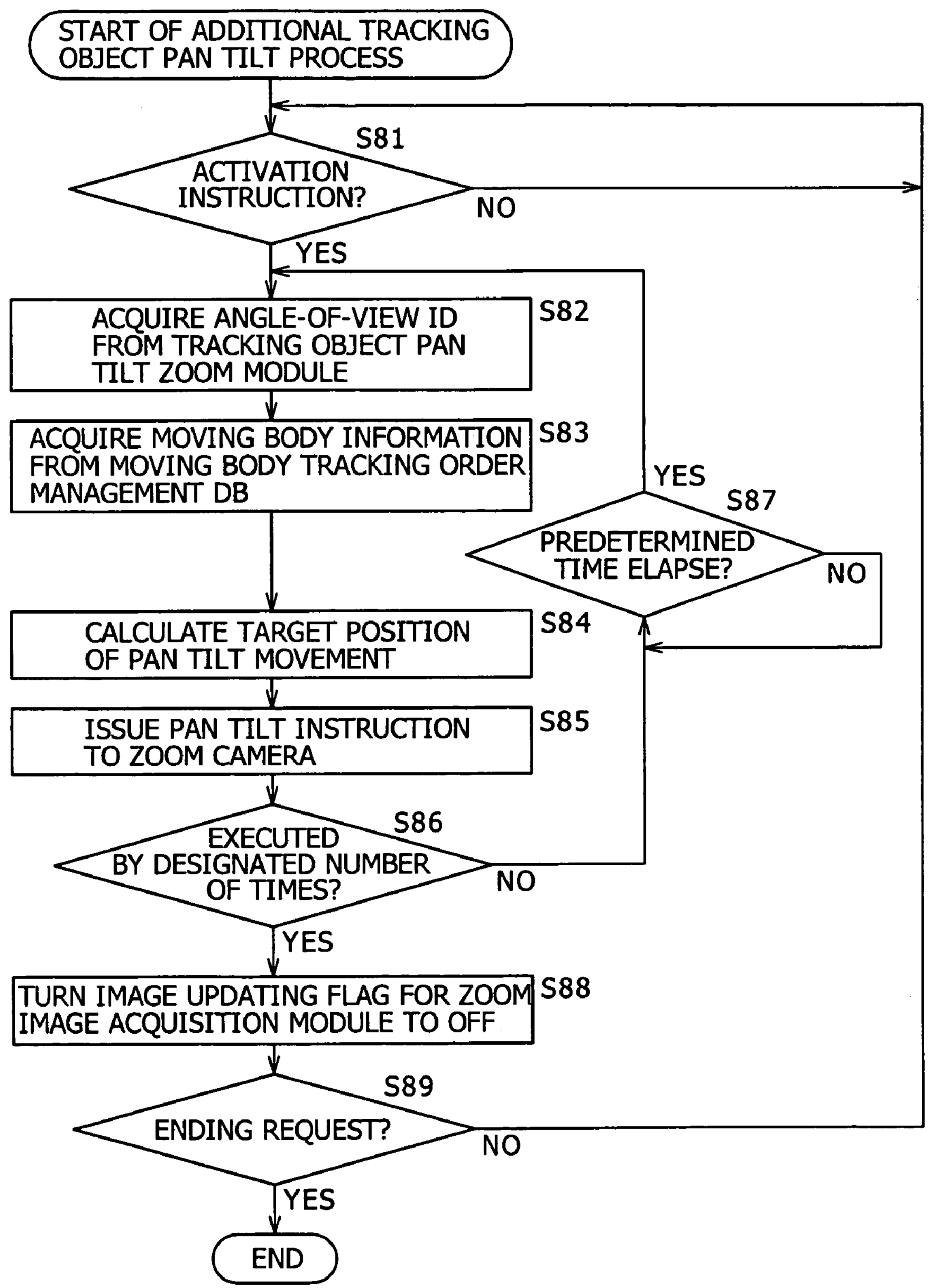
FIG. 14 is a flow chart illustrating an additional tracking object pan tilt process executed by an additional tracking object pan tilt module shown in FIG. 8.

Now, an additional tracking object pan tilt process by the additional tracking object pan tilt module 306 is described with reference to a flow chart of FIG. 14.

At step S81, the additional tracking object pan tilt module 306 decides whether or not an activation instruction is received from the tracking object pan tilt zoom module 305, and repeats the process at step S81 until after an activation instruction is received. If an activation instruction is transmitted to the additional tracking object pan tilt module 306, for example, as a result of the process at step S66 of the flow chart of FIG. 13, then the additional tracking object pan tilt module 306 is activated, and the processing advances to step S82. It is to be noted that, strictly speaking, if the additional tracking object pan tilt module 306 is a program module executed by the CPU 201, then the CPU 201 activates the additional tracking object pan tilt module 306 in accordance with an instruction from the tracking object pan tilt zoom module 305. On the other hand, where the additional tracking object pan tilt module 306 is formed from hardware, operation of the additional tracking object pan tilt module 306 is started.

At step S82, the additional tracking object pan tilt module 306 acquires the angle-of-view ID of an angle of view currently indicated to the zoom camera 122 from the tracking object pan tilt zoom module 305 transmitted, for example, as a result of the process at step S67.

At step S83, the additional tracking object pan tilt module 306 reads out, from within the moving body information stored in the tracking object order management. DB 304, the information of the appearance position of the angle-of-view ID supplied thereto from the tracking object pan tilt zoom module 305.

At step S84, the additional tracking object pan tilt module 306 calculates the position to which the zoom camera 122 is to be panned and tilted, that is, the values (pan tilt values) of the elevation angle in the vertical direction and the depression angle in the horizontal direction to which the zoom camera 122 is to be controlled, based on the information of the appearance position of the angle of view corresponding to the read out angle-of-view ID.

At step S85, the additional tracking object pan tilt module 306 controls the zoom camera 122 based on the pan tilt values determined by the process at step S84 to perform pan tilt movement. At this time, the camera section 122B of the zoom camera 122 controls the pan tilt section 122A in accordance with the request to set the zoom camera 122 to the determined elevation angle and depression angle.

At step S86, the additional tracking object pan tilt module 306 decides whether or not the processes at steps S82 to S85 are repeated by a designated number of times. If it is decided that the processes are not repeated by the designated number of times, then the processing advances to step S87.

At step S87, the additional tracking object pan tilt module 306 decides whether or not a predetermined period of time elapses at step S87, and repeats the process until after it is decided that the predetermined period of time elapses. When it is decided that the predetermined period of time elapses, the processing returns to step S82 so that the processes at the steps beginning with step S82 are repeated. It is to be noted that the predetermined period of time in the process at step S87 is sufficiently shorter than the predetermined period of time in the process at step S70 of the flow chart of FIG. 13.

On the other hand, if it is decided at step S86 that the processes at step S82 to S85 are repeated by the designated number of times, then the processing advances to step S88. At step S88, the additional tracking object pan tilt module 306 sets the image updating flag for the zoom image acquisition module 307 to OFF.

Then at step S89, the additional tracking object pan tilt module 306 decides whether or not a request to end the processing is issued. If it is decided that a request to end the processing is not issued, then the processing returns to step S81 so that the processes at the steps beginning with step S81 are repeated.

On the other hand, if it is decided at step S89 that a request to end the processing is issued, and then the processing is ended.

By the processes described above, also after the zoom camera 122 is set to an angle of view based on the angle-of-view ID of a moving body having a comparatively high priority rank by the tracking object pan tilt zoom module 305, the zoom camera 122 can be controlled following up the variation of the angle of view of the moving body by a designated number of times at short intervals of time. As a result, even if the zoom camera 122 is set, for example, to an angle of view of a moving body having a comparatively high priority rank by the tracking object pan tilt zoom module 305 and the moving body actually moves in an interval of time until a pan tilt state of the zoom camera 122 is entered (for example, even if several seconds elapse while the zoom camera 122 rotates itself by 180° and a moving body comes to a position different from a position at which it is captured by the sensor camera 121), the pan tilt values of the zoom camera 122 can be updated to control the zoom camera 122 based on information of the still latest appearance position at short intervals of time later. Therefore, the moving body can be captured for a period of time before the zooming is completed. Accordingly, for example, such a situation that a moving body is displaced out of a moving body framework to disable image pickup of the moving body as a result of zooming can be eliminated.

Figure 15:
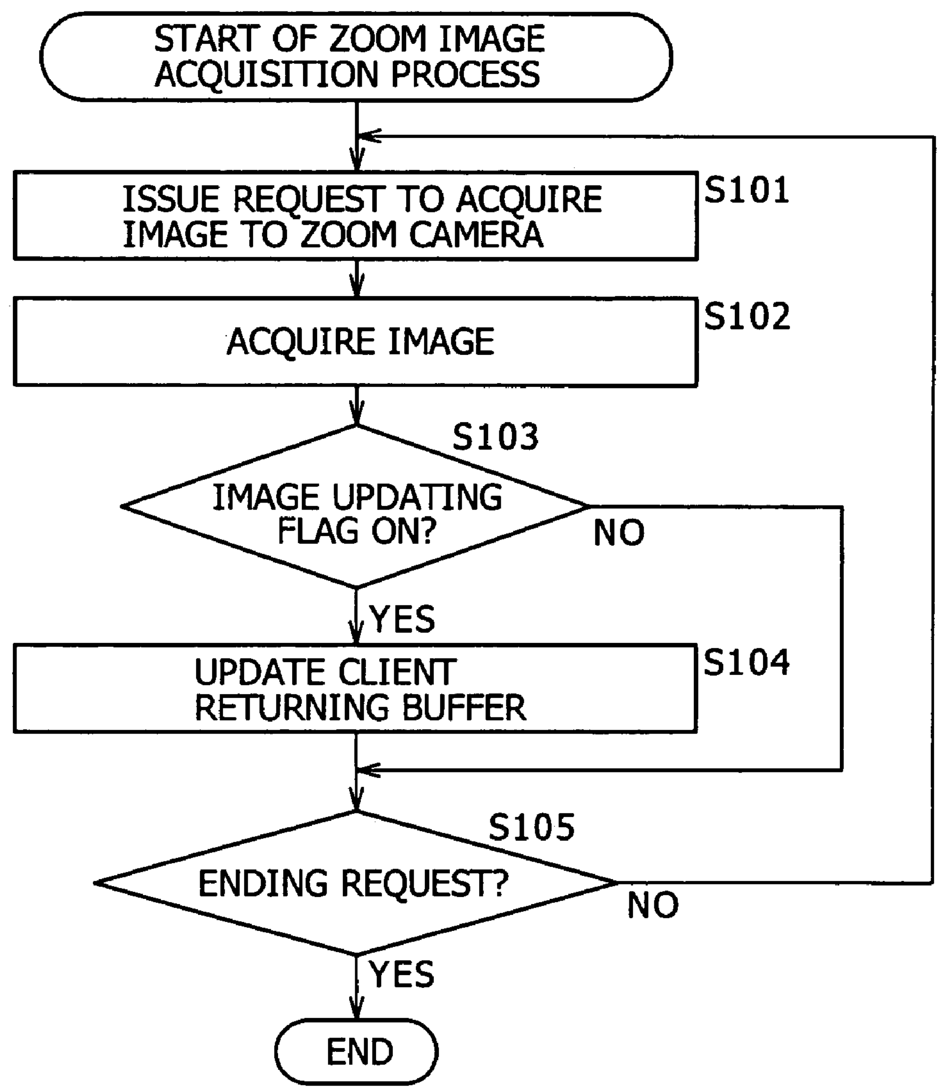
FIG. 15 is a flow chart illustrating a zoom image acquisition process executed by a zoom image acquisition module shown in FIG. 8.

Now, a zoom image acquisition process by the zoom image acquisition module 307 is described with reference to a flow chart of FIG. 15.

At step S101, the zoom image acquisition module 307 issues a request to acquire an image to the zoom camera 122. At this time, the zoom camera 122 supplies an image in accordance with the request.

As a result, at step S102, the zoom image acquisition module 307 acquires the image transmitted thereto from the zoom camera 122.

At step S103, the zoom image acquisition module 307 decides whether or not the image updating flag is ON. For example, if the image updating flag is set to ON by the process at step S65 of the flow chart of FIG. 13 and then is not set to OFF at step S88 of the flow chart of FIG. 14, then the zoom image acquisition module 307 decides that the image updating flag is ON. Then, the processing advances to step S104.

At step S104, the zoom image acquisition module 307 updates the client returning buffer not shown with the image transmitted thereto from the zoom camera 122.

On the other hand, if it is decided at step S103 that the image updating flag is OFF, then the process at step S104 is skipped.

At step S105, the zoom image acquisition module 307 decides whether or not an ending request is received. For example, if it is decided that an ending request is not received, then the processing returns to step S101, but if it is decided that an ending request is received, then the processing is ended.

By the processes described above, while the image updating flag remains ON, the client returning buffer can be successively updated with the zoom image acquired by the zoom image acquisition module 307.

Figure 16:
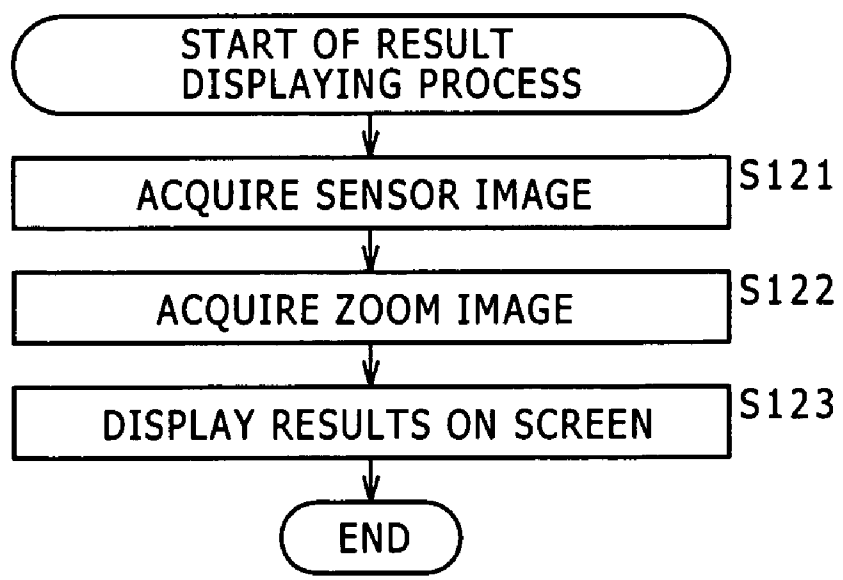
FIG. 16 is a flow chart illustrating a result displaying process executed by a result displaying module shown in FIG. 8.

Now, a result displaying process by the result displaying module 308 is described with reference to a flow chart of FIG. 16.

At step S121, the result displaying module 308 acquires a sensor image stored in a buffer not shown of the sensor image acquisition module 301.

At step S122, the result displaying module 308 acquires a zoom image stored in another buffer not shown of the zoom image acquisition module 307.

At step S123, the result displaying module 308 causes, for example, a display unit to display the sensor image and the zoom image.

Since the sensor image and the zoom image are displayed by the processes described above, only when a moving body is detected, the sensor image and the zoom image can be displayed. It is to be noted that moving body information stored in the tracking object order management DB 304 may be read out and displayed.

Figure 17:
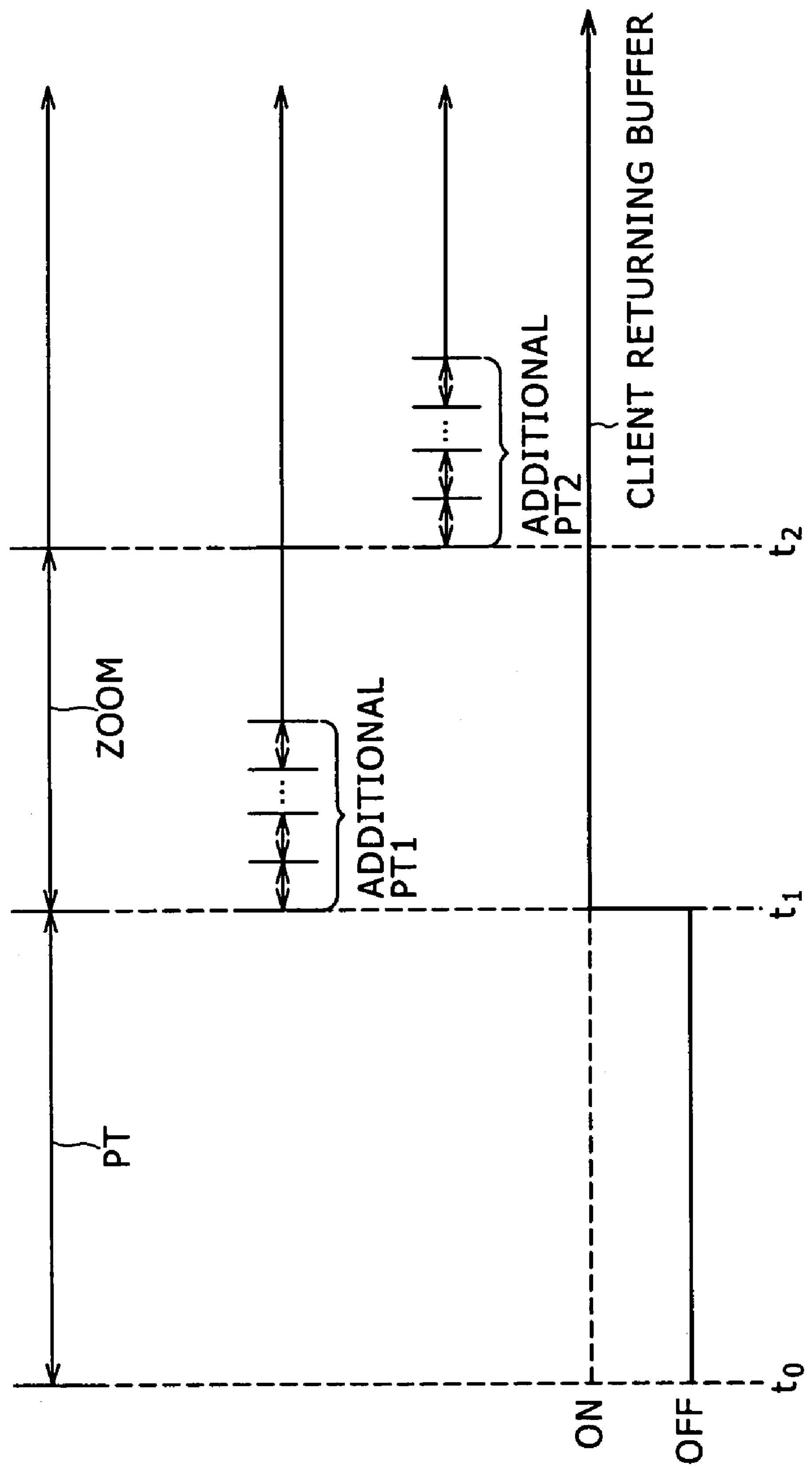
FIG. 17 is a flow chart illustrating a series of processes executed by the monitoring system of FIG. 5.

The processes of the monitoring system 101 of FIG. 5 described above can be summarized as indicated by a timing chart of FIG. 17. Referring to FIG. 17, the sensor image acquisition process (FIG. 10) is repeated at predetermined intervals of time. Then, after a moving body is detected by the moving body detection process (FIG. 12) based on a sensor image supplied by the process at step S21 of the image pickup angle-of-view calculation process (FIG. 11), the angle of view of the moving body is calculated by the image pickup angle-of-view calculation process. Then, moving body information is produced using the calculated angle of view as an appearance position of the moving body, and a tracking rank of the moving body is stored into the tracking object order management DB 304. The sequence of the processes described is repeated.

In particular, the tracking object pan tilt zoom module 305 controls the pan tilt movement of the zoom camera 122 for a period of time from time t0 to time t1 indicated at the highest stage in FIG. 17 (range of PT in FIG. 17) at an appearance position (angle of view) corresponding to an angle-of-view ID of each moving body in a descending order of the priority rank based on the moving body information stored in the tracking object order management DB 304.

Then, as seen at the highest stage in FIG. 17, the tracking object pan tilt zoom module 305 starts adjustment of the zooming of the zoom camera 122 at time t1. Further, at time t1, as seen at the lowest stage in FIG. 17, a zoom image picked up by the zoom camera 122 begins to be stored into the client returning buffer of the zoom image acquisition module 307 to update the client returning buffer (the client returning buffer is turned ON). Thereupon, the additional tracking object pan tilt module 306 repeats the additional tracking pan tilt process illustrated at the second highest stage in FIG. 17 by a designated number of times at predetermined short intervals of time (range of an additional PTI in FIG. 17). It is to be noted that the additional tracking object pan tilt process may be performed otherwise after time t2 at which the zooming is completed by the tracking object pan tilt zoom module 305 as seen from the second lowest stage in FIG. 17.

As a result, as regards a zoom image displayed by the result displaying module 308, since the client returning buffer is OFF for a period of time for which the zoom camera 122 is panned and tilted by a great amount by the tracking object pan tilt zoom process as seen in FIG. 17, no zoom image is picked up, and therefore, a smooth pan tilt zoom image can be displayed. At this time, because the additional tracking object pan tilt process is repeated at shorter intervals of time than those of the tracking object pan tilt zoom process, even if the moving body moves, the angle of view to which the zoom camera 122 is to be set is successively updated based on the latest angle of view. Therefore, a zoom image in which the moving body is captured accurately can be picked up. It is to be noted that, also in this instance, although a pan tilt process is applied, since the additional tracking pan tilt process is repeated at short intervals of time in a state wherein the zoom camera 122 is already set to a rough pan tilt position by the pan tilt process in the tracking object pan tilt zoom process, the pan tilt process does not involve a great amount of movement of the zoom camera 122. Therefore, a smooth image can be reproduced.

It is to be noted that, in the foregoing description, the additional tracking object pan tilt module 306 repeats the additional tracking object pan tilt process at intervals of time sufficiently shorter than the time intervals at which the tracking object pan tilt zoom process is repeated by the tracking object pan tilt zoom module 305 so that the zoom camera 122 follows up the movement of a moving object at a timing after the zoom camera 122 is panned and tilted by the tracking object pan tilt zoom process. However, since the moving body sometimes exhibits no movement at a timing after the zoom camera 122 is panned and tilted by the tracking object pan tilt zoom process, the additional tracking object pan tilt process may additionally be repeated otherwise at predetermined short intervals of time, for example, when some movement of the moving body is detected during detection of presence/absence of a movement of the moving body which is performed after the pan tilt movement by the tracking object pan tilt zoom process.

Figure 18:
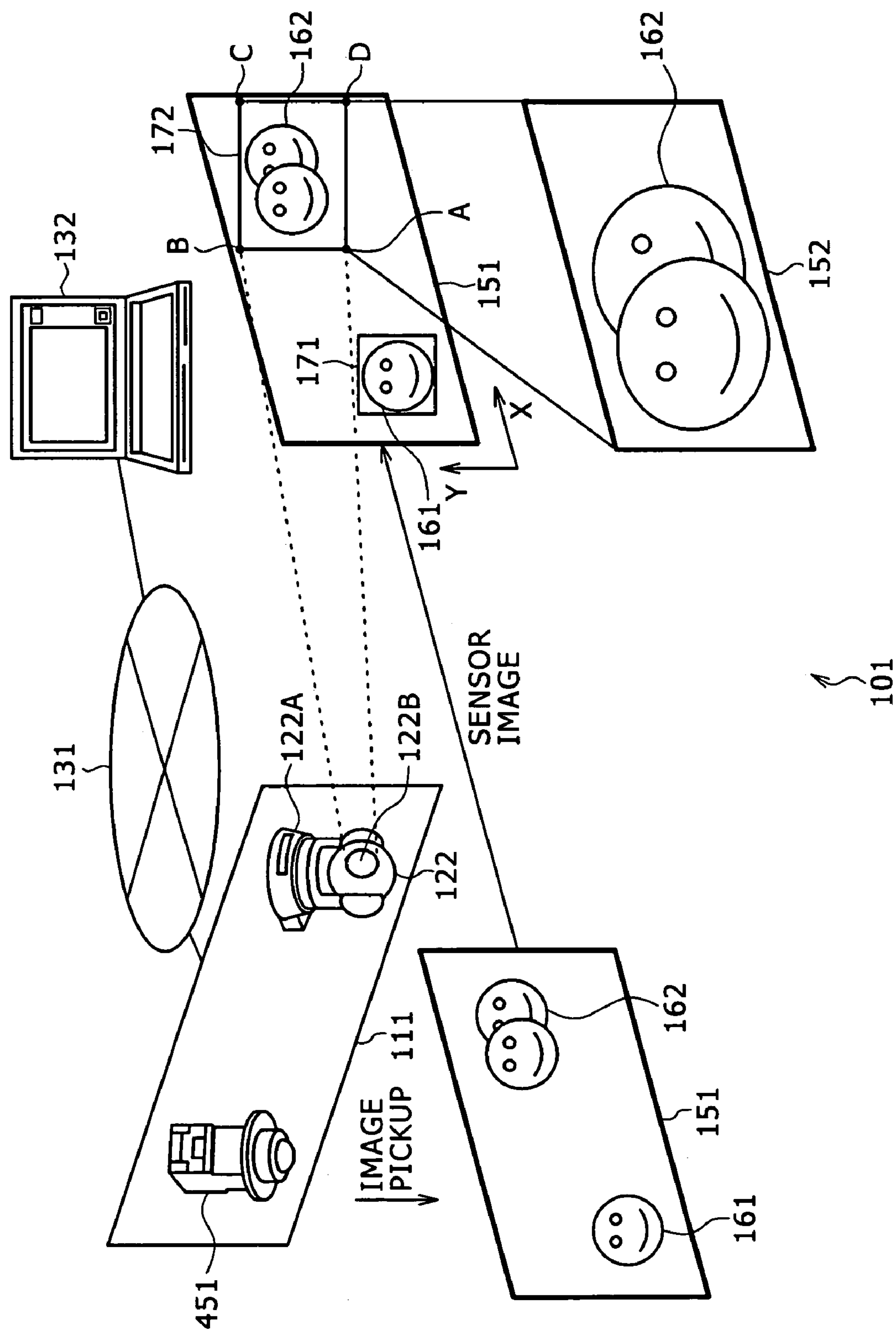
FIGS. 18 and 19 are schematic views showing different examples of the configuration of the monitoring system shown in FIG. 5.

Further, while, in the foregoing description, the sensor camera 121 is used as means for picking up an image of an entire region to be monitored, the image pickup means is not limited to this but any image pickup means may be used only if it can pick up an image of the entire region. For example, a stationary camera 451 which can perform omnidirectional image pickup over 360 degrees on the real time basis as seen in FIG. 18 may be provided in place of the sensor camera 121 shown in FIG. 6.

Figure 19:
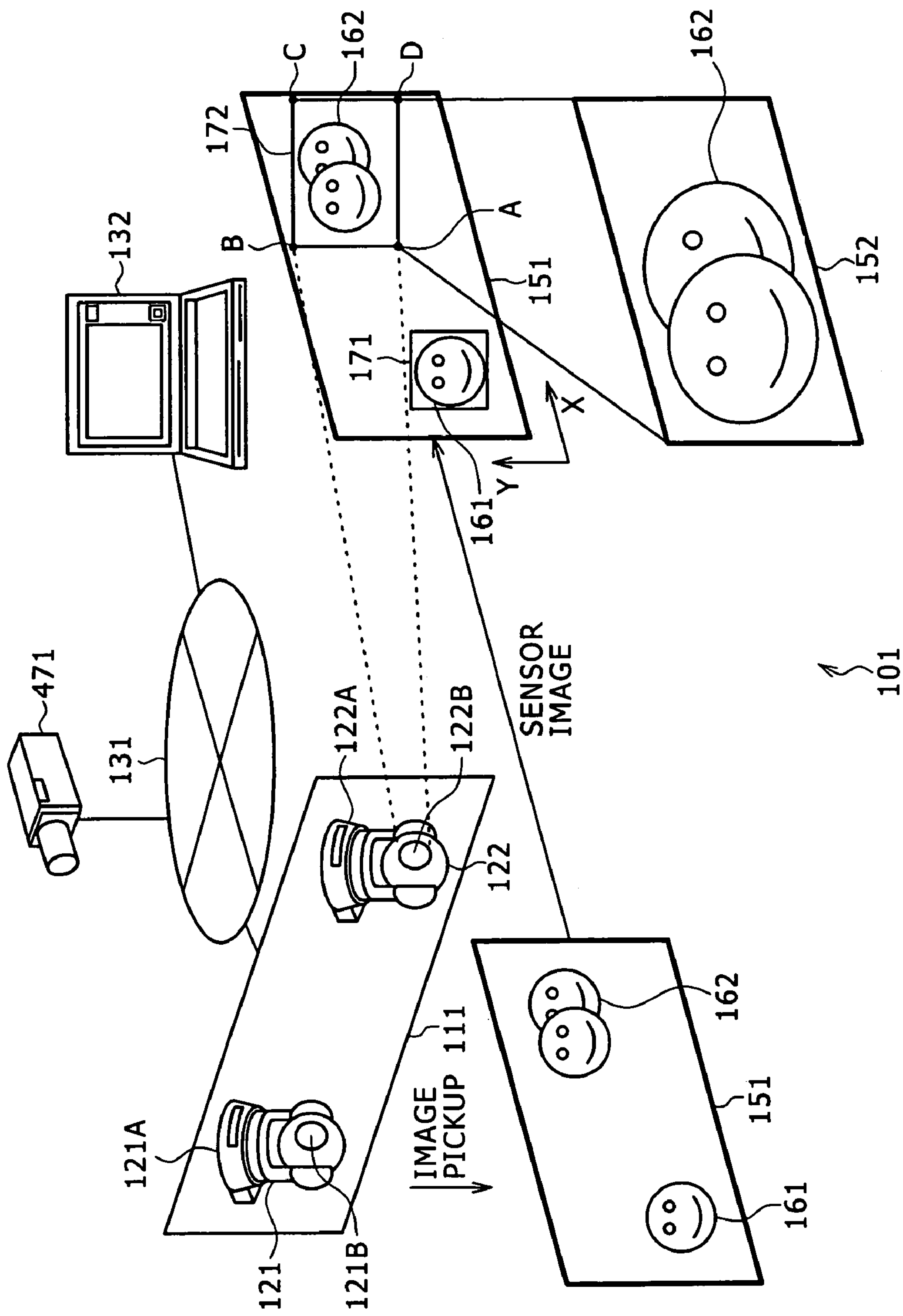

Further, a stationary camera 471 may be provided additionally and connected to the network 131 as seen in FIG. 19. In this instance, the moving body detection module 303 of the client PC 132 detects also moving bodies in a fixed image, which is moving pictures obtained by image pickup by means of the stationary camera 471, and causes the stationary image to be displayed as occasion demands.

Further, while the sensor camera 121 and the zoom camera 122 in the foregoing description are of the type wherein a pan tilt type driving system is adopted, they are not limited to this but a camera of any other driving system may be used only if it can pick up an image of the region 21.

Further, while the monitoring system 101 described hereinabove uses the camera unit 111 which includes the sensor camera 121 and the zoom camera 122, the camera unit 111 may be replaced by a single camera which has both of the function of the sensor camera 121 and the function of the zoom camera 122.

Further, while the foregoing description relates to an example wherein the present invention is applied to a monitoring system, the present invention can be applied to any system for picking up an image of a moving body efficiently, and the application of the present invention is not limited to a monitoring system.

According to the monitoring system described above, since images during movement of a moving body to a position at which an image of the moving body can be picked up (images while such a process as a pan tilt zoom process is executed) are minimized, an image of a predetermined region can be picked up and an image of moving bodies in the region can be picked up accurately. As a result, the picked up image can be observed agreeably.

While the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

The recording medium on or in which the program is recorded may be formed as a removable medium 211 such as, as shown in FIG. 7, a magnetic disk (including a floppy disk), an optical disk (including a CD-ROM (Compact Disc-Read Only Memory) and a DVD (Digital Versatile Disk)), a magneto-optical disk (including an MD (Mini-Disc)), or a semiconductor memory which has the program recorded thereon or therein and is distributed in order to provide the program to a user separately from a computer, or as a hard disk included in the storage section 208 which has the program recorded therein or thereon and is provided to a user in a form wherein it is incorporated in a computer.

It is to be noted that, in the present specification, the steps which describe the program recorded in or on a recording medium may be but need not necessarily be processed in a time series in the order as described, and include processes which are executed parallelly or individually without being processed in a time series (for example, parallel processes or a process by an object).

Further, the program may be processed by a single computer or processed discretely by a plurality of computers. Further, the program may be transferred to and executed by a remote computer.

While a preferred embodiment of the present invention has been described using specific terms, such description is for illustrative purposes only, and it is to be understood that changes and variations may be made without departing from the spirit or scope of the following claims.

What is claimed is:

1. An information processing system, comprising:

region image pickup means for picking up an image of a predetermined region;

detection means for detecting, based on a region image obtained by the image pickup by said region image pickup means, any moving body existing in the predetermined region;

moving body image pickup means for picking up an image of the moving bodies detected by said detection means;

calculation means for calculating an angle of view of each of the moving bodies detected by said detection means;

angle-of-view information storage means for storing information of the individual angles of view of more than one of the moving bodies calculated by said calculation means;

first moving body image pickup control means for controlling the image pickup by said moving body image pickup means of a first moving body of the moving bodies; and second moving body image pickup control means for controlling the image pickup by said moving body image pickup means of a second moving body of the moving bodies, the first moving body image pickup control means controlling the moving body image pickup means to image the first moving body before the second moving body image pickup control means controls imaging the second moving body based on an angle of view of the first moving body.

2. An information processing apparatus, comprising:

detection means for detecting, based on a region image obtained by image pickup of a predetermined region, any moving body existing in the predetermined region;

calculation means for calculating an angle of view of each of the moving bodies detected by said detection means;

angle-of-view information storage means for storing information of the individual angles of view of more than one of the moving bodies calculated by said calculation means;

first moving body image pickup control means for controlling image pickup of a first moving body of the moving bodies; and second moving body image pickup control means for controlling image pickup of a second moving body of the moving bodies moving bodies, the first moving body image pickup control means controlling imaging of the first moving body before the second moving body image pickup control means controls imaging the second moving body based on an angle of view of the first moving body.

3. The information processing apparatus according to claim 2, further comprising:

priority rank setting means for setting, based on a predetermined condition, priority ranks to the individual angles of view of the moving bodies stored in said angle-of-view information storage means;

said first moving body image pickup control means selecting a moving body in a descending order of the priority degree set by said priority rank setting means from within the information of the angles of view of the moving bodies stored in said angle-of-view information storage means and control the image pickup of the moving bodies based on the information of the angle of view of a selected moving body.

4. The information processing apparatus according to claim 3, wherein the predetermined condition includes the time at which any of the moving bodies moves, the position of the moving body in the region image, the size of the moving body in the region image or the aspect ratio of the moving body.

5. The information processing apparatus according to claim 2, wherein said first moving body image pickup control means controls the position in a horizontal direction, the position in a vertical direction, and the telephoto magnification of the moving bodies upon the image pickup based on the information of the angle of view of the particular moving body from within the information of the angles of view of the moving bodies stored in said angle-of-view information storage means.

6. The information processing apparatus according to claim 2, wherein said second moving body image pickup control means controls the position in a horizontal direction and the position in a vertical direction of the moving bodies upon the image pickup based on the information of the angle of view of the particular moving body at a timing after the image pickup of the moving bodies is controlled by said first moving body image pickup control means.

7. The information processing apparatus according to claim 2, wherein said second moving body image pickup control means controls the image pickup of the moving bodies by a predetermined number of times at predetermined intervals of time based on the information of the angle of view of the particular moving body at a timing after the image pickup of the moving bodies is controlled by said first moving body image pickup control means.

8. The information processing apparatus according to claim 2, wherein the image pickup of the particular moving body starts based on the information of the angle of view of the particular moving body at a timing after the image pickup of the moving bodies is controlled by said first moving body image pickup control means.

9. An information processing method, comprising:

detecting, based on a region image obtained by image pickup of a predetermined region, any moving body existing in the predetermined region;

calculating an angle of view of each of the moving bodies detected by the process at the detecting;

storing information of the individual angles of view of more than one of the moving bodies calculated by the process at the calculating; and controlling the image pickup of a first moving body of the moving bodies before imaging a second moving body of moving bodies based on the angles of view of the moving bodies.

10. A computer readable medium including computer executable instructions, wherein the instructions, when executed by a processor, cause the processor to perform a method comprising:

detecting, based on a region image obtained by image pickup of a predetermined region, any moving body existing in the predetermined region;

calculating an angle of view of each of the moving bodies detected by the process at the detecting;

storing information of the individual angles of view of more than one of the moving bodies calculated by the process at the calculating; and controlling the image pickup of a first moving body of the moving bodies before imaging a second moving body of moving bodies based on the angles of view of the moving bodies.

11. An information processing system, comprising:

a region image pickup section configured to pick up an image of a predetermined region;

a detection section configured to detect, based on a region image obtained by the image pickup by said region image pickup section, any moving body existing in the predetermined region;

a moving body image pickup section configured to pick up an image of the moving bodies detected by said detection section;

a calculation section configured to calculate an angle of view of each of the moving bodies detected by said detection section;

an angle-of-view information storage section configured to store information of the individual angles of view of more than one of the moving bodies calculated by said calculation section;

a first moving body image pickup control section configured to control the image pickup by said moving body image pickup section of a first moving body of the moving bodies; and a second moving body image pickup control section configured to control the image pickup by said moving body image pickup section of a second moving body of the moving bodies, the first moving body image pickup control section configured to control imaging of the first moving body before the second moving body image pickup control section controls imaging the second moving body based on an angle of view of the first moving body.

12. An information processing apparatus, comprising:

a detection section configured to detect, based on a region image obtained by image pickup of a predetermined region, any moving body existing in the predetermined region;

a calculation section configured to calculate an angle of view of each of the moving bodies detected by said detection section;

an angle-of-view information storage section configured to store information of the individual angles of view of more than one of the moving bodies calculated by said calculation section;

a first moving body image pickup control section configured to control the image pickup by said moving body image pickup section of a first moving body of the moving bodies; and a second moving body image pickup control section configured to control the image pickup of a second moving body of the moving bodies, the first moving body image pickup control section configured to control imaging of the first moving body before the second moving body image pickup control section controls imaging the second moving body based on an angle of view of the first moving body.

* * * * *